United States Patent
Hu et al.

(10) Patent No.: US 11,199,447 B1
(45) Date of Patent: Dec. 14, 2021

(54) SINGLE-MODE, HIGH-FREQUENCY, HIGH-POWER NARROWBAND SPINTRONIC TERAHERTZ EMITTER

(71) Applicant: Wisconsin Alumni Research Foundation, Madison, WI (US)

(72) Inventors: Jiamian Hu, Middleton, WI (US); Shihao Zhuang, Madison, WI (US)

(73) Assignee: Wisconsin Alumni Research Foundation

( * ) Notice: Subject to any disclaimer, the term of this patent is extended or adjusted under 35 U.S.C. 154(b) by 0 days.

(21) Appl. No.: 17/074,756

(22) Filed: Oct. 20, 2020

(51) Int. Cl.
  G01J 3/10 (2006.01)
  H01S 1/02 (2006.01)
  G01J 3/453 (2006.01)

(52) U.S. Cl.
  CPC ............ G01J 3/108 (2013.01); G01J 3/453 (2013.01); H01S 1/02 (2013.01)

(58) Field of Classification Search
  CPC ............ G01J 3/108; G01J 3/453; H01S 1/02
  USPC .................................................... 250/339.08
  See application file for complete search history.

(56) References Cited

U.S. PATENT DOCUMENTS

| | | | |
|---|---|---|---|
| 7,652,769 B2 | 1/2010 | Zhao et al. | |
| 10,161,790 B2 | 12/2018 | Ding et al. | |
| 2001/0020884 A1* | 9/2001 | Araki | B82Y 10/00 336/200 |
| 2002/0008948 A1* | 1/2002 | Sasaki | H01F 10/3281 360/324.12 |
| 2002/0030950 A1* | 3/2002 | Sano | G11B 5/3903 360/324.11 |
| 2002/0067480 A1* | 6/2002 | Takahashi | G01N 21/49 356/317 |
| 2004/0042132 A1* | 3/2004 | Tsuchiya | B82Y 10/00 360/324.12 |
| 2012/0113417 A1* | 5/2012 | Linfield | C30B 25/02 356/300 |
| 2019/0227404 A1* | 7/2019 | Wu | H02K 35/00 |
| 2021/0199571 A1 | 7/2021 | Hu et al. | |

OTHER PUBLICATIONS

J.-M. Hu, et al., "Purely Electric-Field-Driven Perpendicular Magnetization Reversal," Nano Letters, 15, 616(2015).
J.-M. Hu, et al., "Fast Magnetic Domain-Wall Motion in a Ring-Shaped Nanowire Driven by a Voltage," Nano Letters, 16, 2341(2016).
J.-M. Hu, et al., "High-density magnetoresistive random access memory operating at ultralow voltage at room temperature," Nature Communications, 2, 1(2011).

(Continued)

Primary Examiner — David P Porta
Assistant Examiner — Gisselle M Gutierrez
(74) Attorney, Agent, or Firm — Bell & Manning, LLC; Michelle Manning

(57) ABSTRACT

Acoustically mediated spintronic THz emitters based on a stacked, multilayered heterostructure that includes a light-to-acoustic transducer layer, a thermal insulation layer, and a magnetic layer are provided. In the emitters, fast acoustic pulses give rise to long-distance propagation of THz exchange spin waves in a magnetic film. Also provided are THz time-domain spectrometers (THz-TDSs) that incorporate the THz emitters.

20 Claims, 13 Drawing Sheets

(56) References Cited

OTHER PUBLICATIONS

G. P. Carman et al., "Strain-mediated magnetoelectrics: Turning science fiction into reality,", *MRS Bulletin*, 43, 822 (2018).

J.-M. Hu, et al., "Strain-mediated voltage controlled switching of magnetic skyrmions in nanostructures," *npj Computational Materials*, 4, 1(2017).

J.-M. Hu, et al., "Stability and dynamics of skyrmions in ultrathin magnetic nanodisks under strain," *Acta Materialia*, 183, pp. 145-154 (2020).

S. Zhuang et al., "An Ultra-narrowband, Acoustically Mediated Spintronic Terahertz Emitter," arXiv preprint *arXiv:2005.00629* (2020).

Feng et al., "Photonic Structure Enhanced Spintronic Terahertz Emitter," published in 2019 44th International Conference on Infrared, Millimeter, and Terahertz Wave, 2 pages, Sep. 2019.

Gao et al., "Coherent control of femtosecond spin current investigated by polarization dependent terahertz emission spectroscopy in ferromagnetic heterostructures," 2018 IEEE 43rd International Conference on Infrared, Millimeter and Terahertz Waves, 2018.

Uchida et al., "Acoustic spin pumping: Direct generation of spin currents from sound waves in $Pt/Y_3Fe_5O_{12}$ hybrid structures," Journal of Applied Physics 111,053903 (2012), 8 pages.

Weiler et al., "Spin pumping with coherent elastic waves," Phys. Rev. Lett. 108, 176601—Apr. 23, 2020, 8 pages.

Masayoshi Tonouchi, "Cutting-edge terahertz technology," Nature Photonics, vol. 1, Feb. 2007, pp. 97-105.

Henighan et al., "Generation mechanism of terahertz coherent acoustic phonons in Fe," Physical review B 93, 2016, pp. 220301-1 to 220301-5.

Gobaut et al., "FeGaMgO/Fe/GaAs(001) magnetic tunnel junction: Growth and magnetic properties," Journal of Magnetism and Magnetic Materials 383 (2015) pp. 56-59.

Ferguson, B. et al.,Materials for terahertz science and technology. Nature Mater 1, 26-33 (2002). https://doi.org/10.1038/nmat708.

Ho, L., et al., Nature Photon 2, 541-543 (2008). https://doi.org/10.1038/nphoton.2008.174.

\* cited by examiner

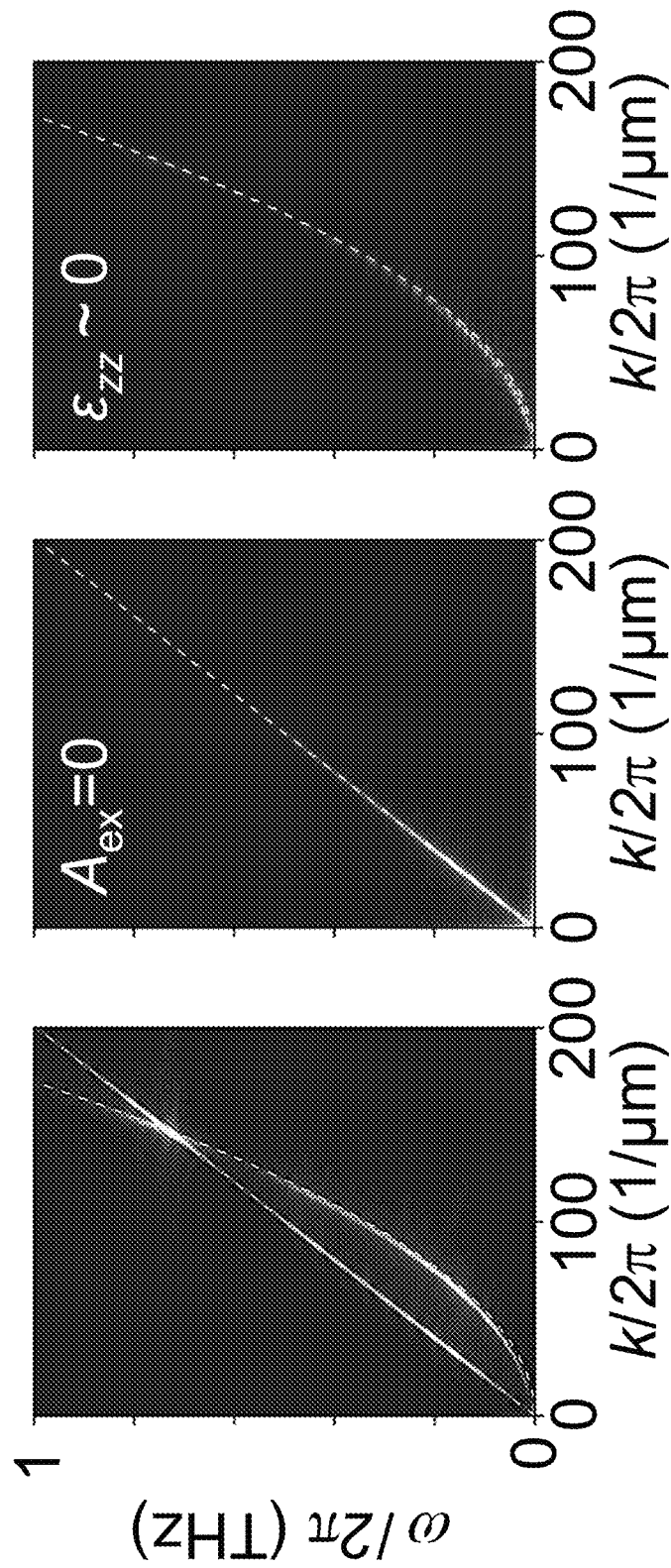

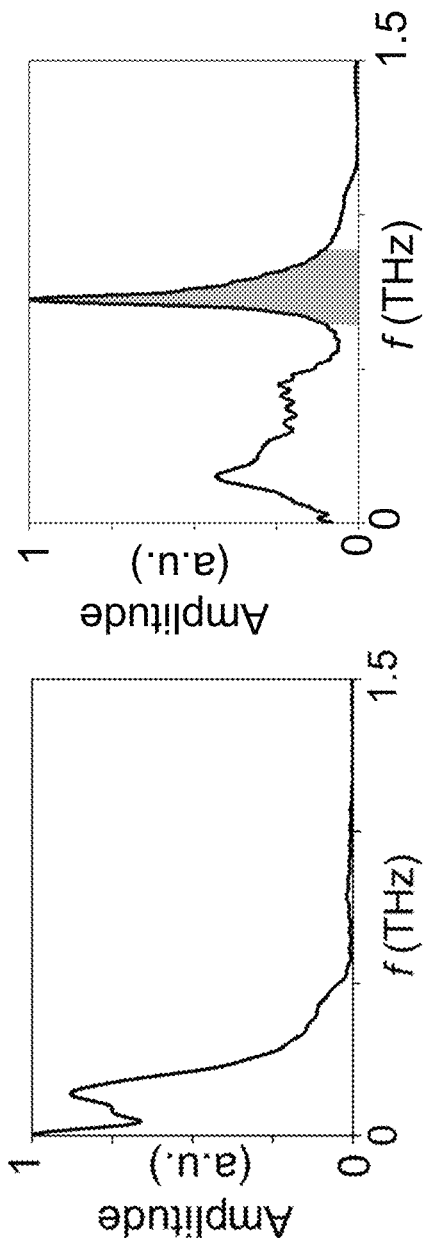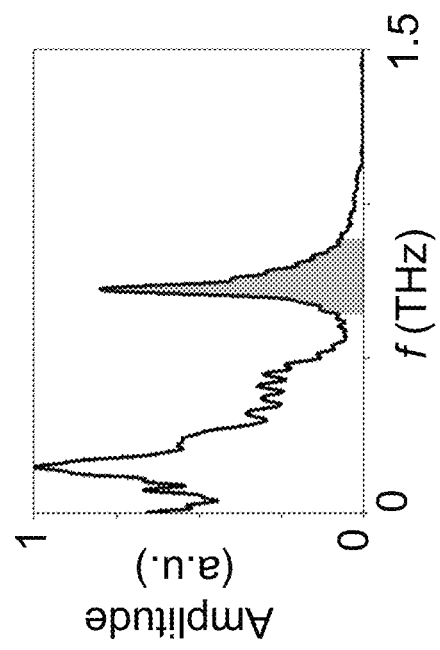
FIG. 6D
FIG. 6E
FIG. 6F

SINGLE-MODE, HIGH-FREQUENCY, HIGH-POWER NARROWBAND SPINTRONIC TERAHERTZ EMITTER

REFERENCE TO GOVERNMENT RIGHTS

This invention was made with government support under 2006028 awarded by the National Science Foundation. The government has certain rights in the invention.

BACKGROUND

The ability to generate terahertz (THz) radiation, the frequency range of 0.1-10 THz, from short laser pulses in the visible or near-infrared range was a milestone in THz technology. It has enabled the development of the THz time-domain spectroscopy (THz-TDS), which relies on the use of a femtosecond (fs) time-scale laser pulse to pump the THz emitter. THz-TDS allows for analyzing the THz spectroscopic fingerprints of a wide variety of materials (e.g., drugs, DNAs, explosives) in a non-destructive manner, and thereby has enabled widespread applications in biology, medicine, pharmaceutics, and security scanning. Notably, since many common packaging materials (e.g., paper, cardboard, and most plastics) are transparent to waves below 3 THz, materials can often be identified without the need to open the package, which is particularly useful to security scanning.

Spintronic THz emitters (STEs) have emerged as promising THz emitters for use in THz-TDS, due to their simple structure, low-cost, high scalability, large THz field magnitude, and tunable THz spectra by an applied magnetic field.

Unfortunately, the THz pulses from most current STE have a relatively broad bandwidth (typically, >1 THz), which leads to relatively low spectral resolution. Therefore, if two materials possess relatively close central peak frequencies in their THz spectra—for example, the central peak frequencies of RDX and PE4 (two common explosives) in absorption spectra are located at 0.65 THz and 0.66 THz, respectively—it would be challenging or even impossible to distinguish them using the existing broadband THz sources.

SUMMARY

Heterostructures that can be used in acoustically mediated spintronic THz emitters for applications such as THz time-domain spectrometry are provided.

One embodiment of a heterostructure includes: a light-to-acoustic transducer layer having a light receiving surface; a thermal insulation layer adjacent to a surface of the transducer layer opposite the light receiving surface; and a magnetic layer comprising a ferromagnetic or ferrimagnetic material adjacent to a surface of the thermal insulation layer opposite the transducer layer, such that the thermal insulation layer is disposed between the transducer layer and the magnetic layer.

One embodiment of a terahertz emitter includes: a heterostructure of a type described herein; and a femtosecond pulse laser positioned to direct femtosecond laser pulses onto the light receiving surface of the heterostructure's transducer layer.

One embodiment of a terahertz time-domain spectrometer includes: a femtosecond pulse laser that emits a pulsed femtosecond laser beam; a beam splitter in a path of the pulse femtosecond laser beam, wherein the beam splitter splits the pulsed femtosecond laser beam into a pump beam and a probe beam; a heterostructure of a type described herein configured in a path of the pump beam such that the pump beam irradiates the heterostructure's transducer layer; a terahertz detector, configured to detect a terahertz pulse output signal emitted from the heterostructure; and a delay line assembly configured in the path of the probe beam to create an adjustable time delay in the probe beam and to direct the probe beam onto the terahertz detector.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 5C shows the results of a 2D fast Fourier transform (FFT) of the spin wave $\Delta m_z(z, t)$ in the magnetic layer of heterostructure of the Example performed to obtain the spin wave dispersion relation $\omega(k)$, which displayed both a linear and parabolic curve.

FIG. 5D shows the results of a 2D FFT of the spin wave $\Delta m_z(z, t)$ in the magnetic layer of heterostructure of the Example, where the exchange coefficient of the magnetic layer (denoted as $A_{ex}$) was set to be zero as a control study. In this case, the obtained $\omega(k)$ relation only displays a linear curve that can be fitted by the linear relation $\omega=v_s k$.

FIG. 5E shows the shows the results of a 2D FFT of the spin wave $\Delta m_z(z, t)$ in the magnetic layer of heterostructure of the Example, where the 2D FFT was performed for the time period that the majority of the elastic wave already left the magnetic layer (that is, $\varepsilon_{zz}$~0). In this case, the obtained relation $\omega(k)$ can be fitted by the formula $\omega=\gamma\sqrt{1+\alpha^2}2A_{ex}/\mu_0 M_s k^2$.

FIG. 6D shows the frequency spectrum of the first wave packet of the $E_{THz}^x(t)$ in FIG. 6A (labelled as "I" therein).

FIG. 6E shows the frequency spectrum of the second wave packet of the $E_{THz}^x(t)$ of FIG. 6A (labelled as "II" therein). The regime of the high-frequency peak is shaded.

FIG. 6F shows the frequency spectrum of the third wave packet of the $E_{THz}^x(t)$ of FIG. 6A (labelled as "III" therein). The regime of the high-frequency peak is shaded.

DETAILED DESCRIPTION

Acoustically mediated spintronic THz emitters in which fast acoustic pulses give rise to long-distance propagation of THz exchange spin waves are provided. Also provided are THz time-domain spectrometers (THz-TDSs) that incorporate the THz emitters.

Figure 1A:
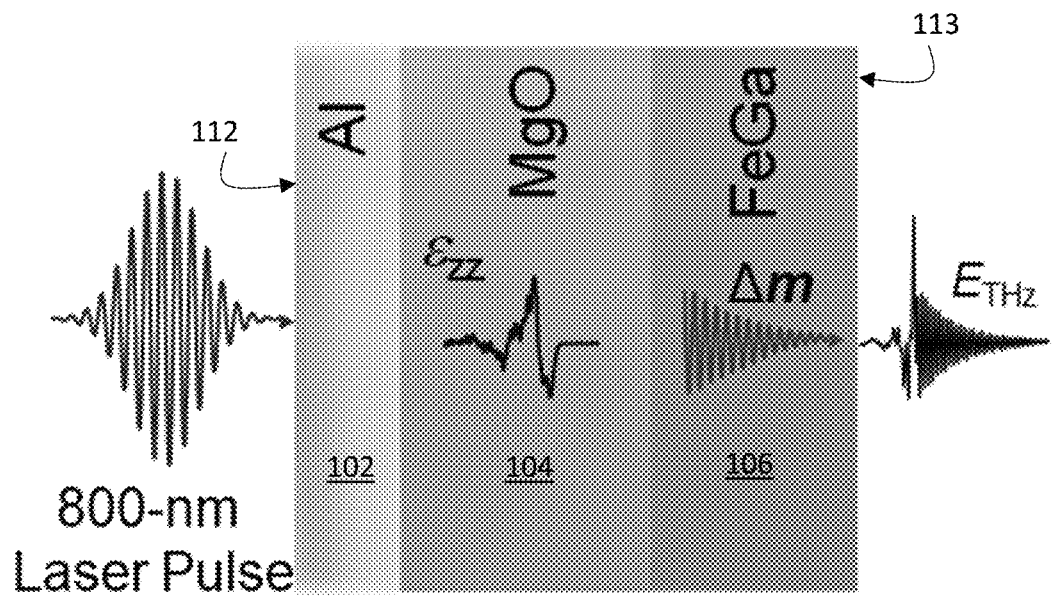
FIG. 1A is a schematic diagram showing a cross-sectional view of one embodiment of an acoustically mediated STE (acousto-STE).

The spintronic THz emitters are based on a stacked, multilayered heterostructure, one embodiment of which is shown in FIG. 1A. The layers of the heterostructure are light-to-acoustic transducer layer 102, a thermal insulation layer 104, and a magnetic layer 106. For the purposes of illustration, suitable materials and layer thicknesses are provided for the heterostructure in FIG. 1A. However, as discussed in more detail below, different materials and layer thicknesses can be used.

Although the inventors do not intend to be bound to any particular theory of the invention, the principles of operation of the THz emitters can be explained as follows. Transducer layer 102 acts as a light-to-acoustic transducer to convert fs time-scale laser pulses incident upon its outermost surface, which is referred to herein as a light-receiving surface 112, into fast (e.g., ps time-scale) acoustic pulses ($\varepsilon_{ij}$), where i and j indicate the Cartesian components of a standard strain tensor, that are injected into magnetic layer 106 giving rise to an elastic wave (also referred to as an acoustic wave) in magnetic layer 106. This elastic wave excites spin waves in magnetic layer 106 through magnetoelastic coupling and short-range exchange coupling. Strong interactions between the spin waves and the elastic wave produce high frequency exchange spin waves propagating in magnetic layer 106. High frequency exchange spin waves incident upon the far surface of magnetic layer 106 are reflected and the incident and reflected exchange spin waves produce a high-frequency standing spin wave, which leads to magnetic dipole emission in the form of narrowband THz electromagnetic radiation ($E_{THz}(t)$ is the electric field component of the radiation) having a peak frequency at the lower end of the THz region of the electromagnetic spectrum. Similarly, standing spin waves reflected from the near surface of magnetic layer 106 can produce a standing spin wave that gives rise to THz radiation. At high frequencies (e.g., frequencies of 0.5 THz or higher), the THz radiation can be produced as single-mode emission with a high power density. By way of illustration, some embodiments of the THz emitters are able to produce single-mode THz emission in a frequency range from 0.5 THz to 1 THz with a power density of greater than $10^3$ W/m² (e.g., power densities in the range from $10^3$ to $10^4$ W/m²). Notably, because the THz emitters do not rely upon the inverse spin-Hall effect for the generation of THz radiation from a charge current, no heavy metal layer is necessary at the output end of the heterostructure.

Metals from which transducer layer 102 can be made include aluminum (Al), Iron (Fe), platinum (Pt), gold (Au), cobalt (Co), and nickel (Ni), or other materials that can convert the incident femtosecond laser pulse into a picosecond acoustic pulse. Thermal expansion coefficients, electron-phonon coupling coefficients, and electronic specific heat coefficients are the key properties that need to be considered when choosing materials for use as transducer layers. Specifically, to generate larger strains, it is better to simultaneously have a large thermal expansion coefficient, a large electron-phonon coupling coefficient, and a small electronic specific heat coefficient. Transducer layer 102 should have a thickness that is at least as large as the absorption depth of the laser pulses in the transducer layer in order to prevent the laser radiation from reaching the thermally insulating layer. However, the transducer layer should be sufficiently thin to produce THz radiation with an amplitude that is sufficiently large for the intended application. Generally, a thinner transducer layer provides a larger temperature gradient across the interface between the transducer layer and the thermal insulation layer. This is advantageous because it leads to the injection of larger elastic strains into the magnetic layer, which results in THz emission with a higher amplitude. The optimal thickness of the transducer layer will depend on the particular metal being used and the required magnitude of the THz output signal. However, by way of illustration, layer thicknesses in the range from about 10 nm to about 100 nm, including thicknesses in the range from about 20 nm to 50 nm, are suitable. The transducer layer may be single-crystalline or polycrystalline or amorphous, and can be formed on the surface of the substrate using known deposition methods, such as magnetron sputtering or electron beam (e-beam) evaporation followed by an anneal.

Thermal insulation layer 104 provides thermal insulation between transducer layer 102 and magnetic layer 106. The thermal insulation layer 104 is transparent to terahertz radiation and is desirably thick enough to shield magnetic layer 106 from most or all of the heat deposited into the heterostructure by the laser pulses. However, because thermal insulation layer 104 increases the size of the heterostructure and introduces a time delay for the acoustic pulse as it travels from transducer layer 102 to magnetic layer 106, it may be desirable for some applications to limit the thickness of the thermal insulation to the thickness needed to provide adequate thermal insulation. By way of illustration, layer thicknesses in the range from about 300 nm to about 500 μm are typically suitable; however, thicknesses outside of this range can be used. Ideally, suitable material for use as the thermal insulation layer should simultaneously have low thermal conductivity (for better shielding the heat), have a lower thermal expansion coefficient than the transducer (for obtaining larger strains), be electronically insulating (for obtaining larger strains), and have a good acoustic match with the magnetic layer (which usually means high speed of sound) such that the acoustic wave would not become smaller in magnitude after entering the magnetic layer. Furthermore, it is even better if the thermal insulation layer can promote the epitaxial growth of a single-crystalline magnetic layer. Magnesium oxide (MgO) is one example of a thermally insulating material that can be used. Other examples include aluminum oxide ($Al_2O_3$), gallium oxide ($Ga_2O_3$), gallium arsenide (GaAs), gadolinium oxide ($Gd_2O_3$), hafnium oxide ($HfO_2$), strontium titanate ($SrTiO_3$).

If it acts as an epitaxial growth substrate for magnetic layer 106, thermal insulation layer 104 will be a single-crystalline substrate. For example, the (001) surface of an MgO wafer can be used for the epitaxial growth of a layer of an iron-gallium alloy (FeGa) using, for example, molecular beam epitaxy (MBE) or pulsed laser deposition (PLD) or magnetron sputtering. Otherwise, the thermal insulation layer can be polycrystalline or amorphous. Methods of forming single-crystalline, polycrystalline, and amorphous layers of the thermal insulation layer include mechanical thinning of a purchased substrate. Alternatively, the thermal insulation layer can be grown on a growth substrate using thin-film deposition methods, such as MBE, PLD, or e-beam evaporation, wherein a sacrificial material layer separates the thermal insulation layer from the substrate. After the thin film is grown, the sacrificial layer can be selectively etched away using suitable chemical solutions (for example, some sacrificial layers are water-soluble) to release the thermal insulation layer. As a result, the released thermal insulation layer can be peeled off from the substrate, forming a freestanding membrane.

Figure 5B:
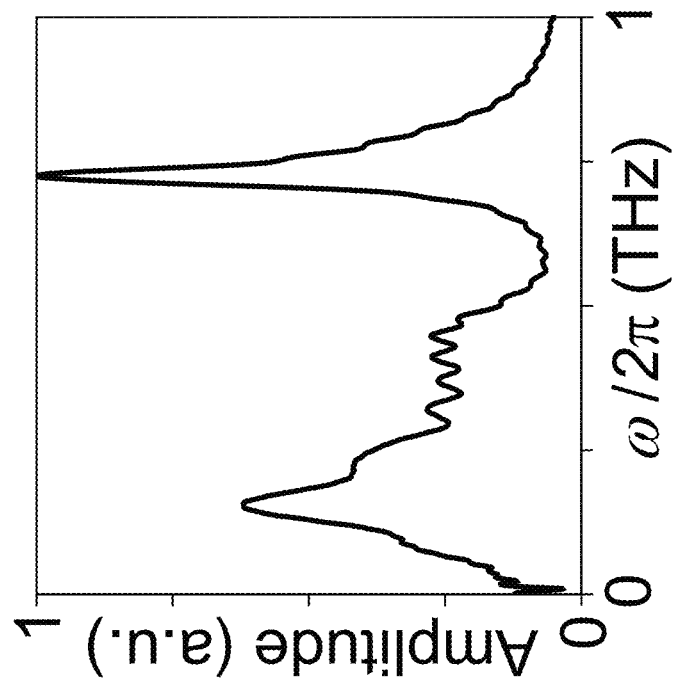
FIG. 5B shows spin wave spectrum in the magnetic layer of the heterostructure of the Example at z=400 nm.

In some embodiments of the THz emitters, magnetic layer 106 is composed of a ferromagnetic material having a tilted magnetization (M). As used herein, the phrase "tilted magnetization" refers to a magnetization vector that is aligned neither parallel to the in-plane direction of the magnetic layer nor perpendicular to the in-plane direction of the magnetic layer (i.e., parallel to the thickness direction (z-axis)), but is instead aligned at an angle between the parallel and perpendicular orientations. The tilted magnetization vector M is illustrated by the arrows in FIG. 5F. A tilted magnetization of the magnetic layer can be induced using a magnetic field generator that applies an external magnetic field to the layer or by introducing residual strains into the magnetic layer. A magnetic field generator may comprise, for example, one or more magnets positioned around the layer to create the desired external magnetic field. When an acoustic pulse is injected from thermal insulation layer 104 into magnetic layer 106, it triggers the precession of the local magnetization vectors. This perturbation of the magnetization launches a spin wave along the thickness direction of magnetic layer 106 via magnetoelastic coupling and short-range exchange coupling. It should be noted, however, that the need for a titled magnetization can be eliminated by design. For example, if the magnetization is parallel to either the x or z axis, other types of acoustic pulses, such as a shear strain rather than the longitudinal $\varepsilon_{zz}$ in FIGS. 1A and 1B, can be used to induce spin waves.

The magnetic material from which magnetic layer 106 is made should have a large exchange coupling coefficient and should provide strong magnetoelastic coupling. Generally, magnetic materials having exchange coupling coefficients of at least 4 pJ m$^{-1}$ and an absolute value of their magnetoelastic coupling coefficient, $|B_1|$ or $|B_2|$, of at least $0.1 \times 10^6$ J m$^{-3}$ are desired. (A larger $|B_1|$ or $|B_2|$ corresponds to stronger interactions between elastic strain and spin via magnetoelastic coupling.) This includes magnetic material having an exchange coefficient of at least 10 pJ m$^{-1}$, at least 15 pJ m$^{-1}$, and at least 20 pJ m$^{-1}$ and a $|B_1|$, of at least $5 \times 10^6$ J m$^{-3}$, at least $10 \times 10^6$ J m$^{-3}$, at least $20 \times 10^6$ J m$^{-3}$, and at least $30 \times 10^6$ J m$^{-3}$. Ferromagnetic $Fe_{1-x}Ga_x$ binary alloys (0<x<1; FeGa alloys) are examples of magnetic materials that have sufficiently large exchange coefficients and sufficiently large magnetoeleastic coupling coefficients. Other suitable magnetic materials include Fe, Co, Ni, and alloys of these elements with or without other elements (e.g., CoFe and CoFeB alloys), Terfenol-D ($Tb_xDy_{1-x}Fe_2$, x≈0.3), and ferrimagnetic materials with strong magnetoelastic coupling, including magnetites ($Fe_3O_4$), cobalt ferrites ($CoFe_2O_4$), yttrium iron garnet ($Y_3Fe_5O_{12}$; YIG), and thulium iron garnet ($Tm_3Fe_5O_{12}$). The exchange coupling coefficients ($A_{ex}$) and magnetoelastic coupling coefficient ($B_1$ or $B_2$) for some of these materials is provided in Table 1.

TABLE 1

Exchange and Magnetoelastic Coupling Coefficients.

| Materials | $A_{ex}$ (pJ m$^{-1}$) | $B_1$ (×10$^6$ J/m$^3$) |
|---|---|---|
| FeGa | 18 | −8.55 |
| CoFe$_2$O$_4$ | 4 | 59 |
| Fe | 21 | −3.43 |
| Ni | 8.2 | 9.2 |
| Co | 27.5 | −8.1 |
| Co$_{20}$Fe$_{60}$B$_{20}$ | 19 | −6.5 |
| Co$_{40}$Fe$_{60}$ | 26.1 | −30 |
| Fe$_3$O$_4$ | 11.9 | 5 |
| Terfenol-D | 9 | ~0 (B$_2$ = −240 × 10$^6$ J/m$^3$) |
| YIG | 4 | 0.3 |

The magnetic layer can be a single-crystal layer, a polycrystalline layer, or an amorphous layer. In most cases, a single-crystal layer will allow for larger perturbation of the local magnetization vector in the magnetic layer due to its stronger magnetoelastic coupling, which can provide a larger-amplitude THz output signal, relative to the output signal produced using a polycrystalline or an amorphous magnetic layer. However, a polycrystalline or an amorphous magnetic layer may be less expensive to produce and can provide a THz output signal having a sufficiently high amplitude for less demanding applications.

Magnetic layer 106 should be thick enough to allow for sufficient coupling between the injected acoustic wave and the local magnetization vectors of the magnetic material and to enable the generation of a standing spin wave. Typically, a thickness of about 200 nm or greater will suffice for this purpose. However, the optimal thickness will depend on the particular magnetic material being used. As discussed in more detail in the Example, the emitted THz radiation may include low frequency, broader band components, along with the high frequency, narrowband component. As the thickness of magnetic layer 106 decreases, the duration of the high frequency component of the THz radiation becomes shorter, magnitude of the high frequency component of the output THz radiation decreases with respect to the low frequency components (e.g., components with frequencies of less than 0.5 THz), and the time between sequential THz pulses decreases. For most applications, it is desirable for the majority (i.e., ≥50%) of the total energy of the emitted THz radiation to come from the high frequency, narrowband component. For this reason, a thickness of 200 nm or greater is generally preferred. However, lower thicknesses, including thicknesses in the range from 150 nm to 200 nm can be used for applications with less demanding requirements. Optionally, the THz emitters can be equipped with a filter that filters out the low frequency components of the emission.

The upper bound on the magnetic layer thickness is not strictly limited. However, if the magnetic material absorbs terahertz radiation, it may be desirable to limit the thickness of the magnetic layer in order to avoid a reduction in the power density of the output signal. By way of illustration, some embodiments of the emitters have a magnetic layer with thickness of up to 1 μm. This includes embodiments of the emitter in which the magnetic layer has a thickness of up to 500 nm. However, thicker magnetic layers can be used.

Although not shown in FIG. 1A, the heterostructure may, optionally, also include a capping layer on the far surface 113 of magnetic layer 106 in order to prevent oxidation of, or mechanical damage to, the magnetic layer. The capping layer may comprise a metal, such as a non-metal, a heavy metal or a non-heavy metal. If the capping layer is made from a material that absorbs in the THz region of the electromagnetic spectrum, such as a metal, its thickness should be limited—typically to 2 nm or smaller. Notably, if a heavy metal is used for the capping layer, since THz radiation generation does not rely upon the creation of a charge current via the inverse spin-Hall effect, the heavy metal layer can be thinner than the diffusion length of the spin current in the heavy metal. Notably, the oxidation of the metal capping layer does not negatively impact the operation of the device. Examples of metals that can be used include, but are not limited to, Cu, Al, Pt, Pd, Ti, W, and Mo.

Figure 2:
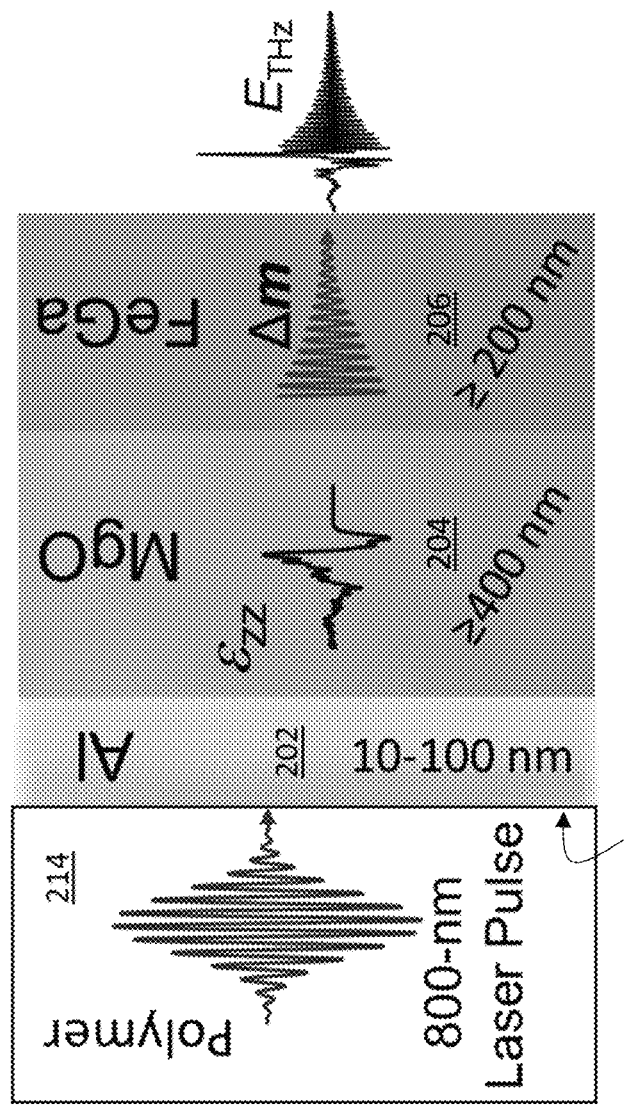
FIG. 2 is a schematic diagram showing a cross-sectional view of another embodiment of an acousto-STE.
Figure 3:
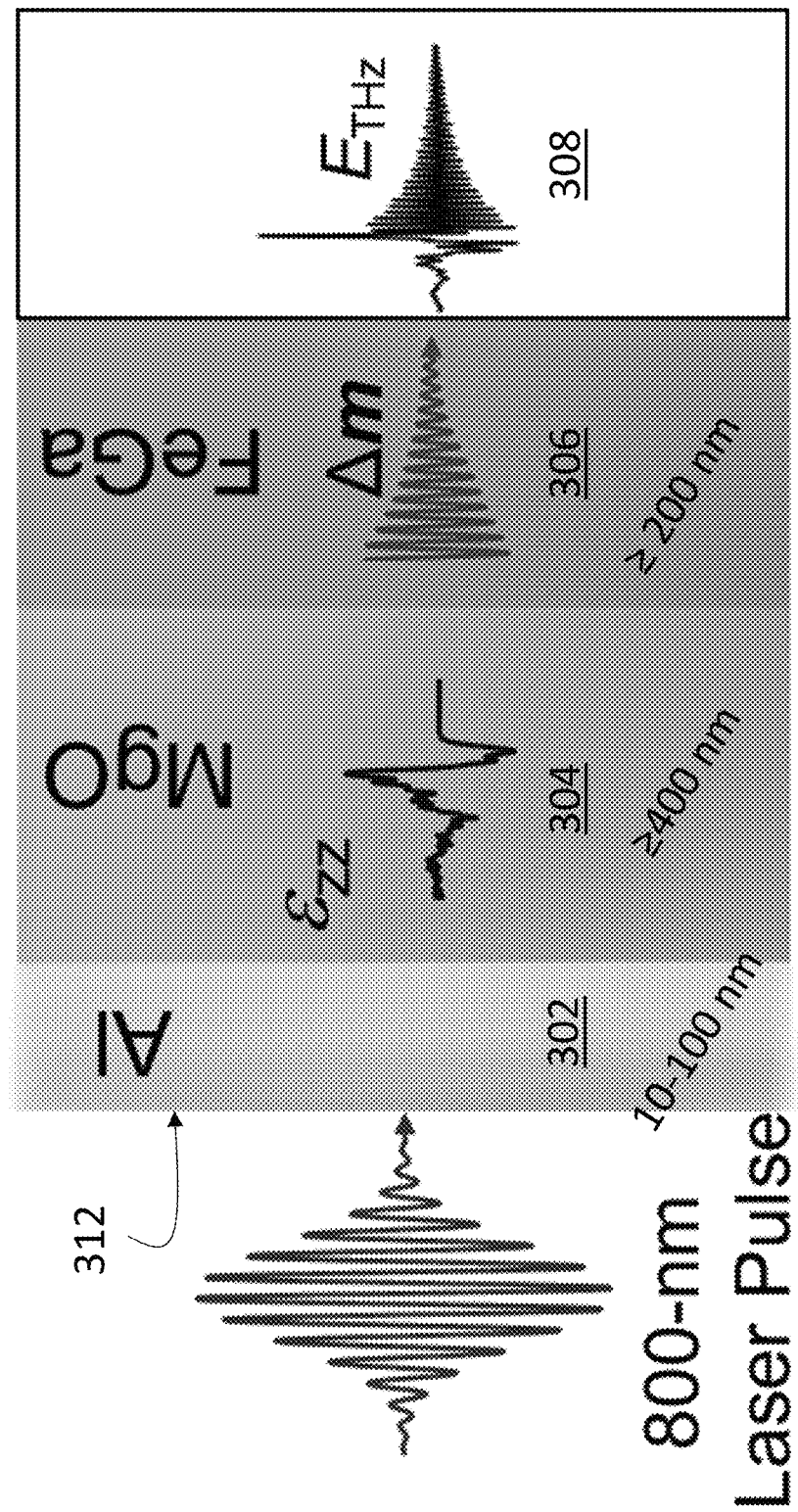
FIG. 3 is a schematic diagram showing a cross-sectional view of another embodiment of an acousto-STE.

For purposes of illustration, FIG. 2 and FIG. 3 show heterostructures that can be used as alternatives to the heterostructure of FIG. 1A. In the heterostructure of FIG. 2, aluminum transducer layer 202 is juxtaposed with a mechanically soft polymer substrate 214. A thin single-crystalline MgO thermal insulation layer 204 is disposed on transducer layer 202 using, for example, e-beam deposition. Magnetic layer 206 is a layer of single-crystalline FeGa, which may be grown epitaxially on MgO film 204. In addition, the heterostructure includes a polymer support substrate 214 adjacent to the light receiving surface 212 of transducer layer 202. The support substrate can be used to provide structural integrity and to protect the transducer layer from oxidation and/or mechanical damage and should be made of a material that is optically transparent to the laser pulses. For a material to be optically transparent to a laser pulse, it need not transmit 100% of the laser light (visible or near-infrared or near-ultraviolet). Rather it need only transmit enough of the light to generate a suitable acoustic wave in the transducer layer. For example, materials that transmit at least 70% of the laser pulse, at least 80% of the laser pulse, or at least 90% of the laser pulse can be characterized as optically transparent. Moreover, it is better to have an electronically insulating substrate so that the laser-excited hot electrons in the transducer layer will not diffuse into the substrate, which will in turn yield larger acoustic pulse. Suitable support substrate polymers include polydimethylsiloxane (PDMS) and polymethylmethacrylate (PMMA). Although not shown in FIG. 2, the heterostructure may, optionally, further include a capping layer, as described above, on the far surface of magnetic layer 206.

In the heterostructure of FIG. 3, transducer layer 302 is a layer of aluminum having light receiving surface 312 for irradiation with a fs laser pulse, thermal insulation layer 304 is single-crystalline or polycrystalline MgO, and magnetic layer 306 is a layer of single-crystalline or polycrystalline FeGa. In addition, the heterostructure includes substrate 308 adjacent to the THz output surface of magnetic layer 306. Substrate 308 may be composed of a material, such as single-crystalline MgO, upon which magnetic layer 306, such as FeGa, can be epitaxially grown. The substrate is transparent to THz radiation and can be used to protect the magnetic layer from oxidation and/or mechanical damage. For a material to be transparent to the THz signal, it need not transmit 100% of the emitted THz electromagnetic wave. Rather, it need only transmit enough of the emitted THz electromagnetic wave to render the emitter suitable for its intended purpose. Thus, materials that transmit at least 70% of the THz output signal, at least 80% of the THz output signal, or at least 90% of the THz output signal can be characterized as transparent. Other suitable support substrate materials include quartz, sapphire, glass, and silicon.

Although FIG. 1-FIG. 3 include illustrative materials and thicknesses for the various layers in the structures, it should be understood that other materials and layer thicknesses can be used, provided that the layers are able to carry out their respective functions, as described above, to produce an operable THz emitter.

The lasers for the spintronic terahertz emitters shown in FIGS. 1-3 are positioned to direct pulsed femtosecond time-scale laser pulses into the light receiving surfaces of the transducer layers. As used herein, femtosecond time-scale laser pulses are pulses having a pulse duration in the range from 1 fs to 100 fs. This includes femtosecond time-scale laser pulses having a pulse duration in the range from 5 fs to 100 fs and further includes femtosecond time-scale laser pulses having a pulse duration in the range from 10 fs to 60 fs. Femtosecond time-scale laser pulses are also referred to herein as fs pulses or fs laser pulses. The laser light includes wavelengths in the visible, near-infrared, and near-ultraviolet regions of the electromagnetic spectrum. For example, wavelengths in the range from about 300 nm to 1100 nm can be used, preferably within the range from about 600 nm to 1000 nm. The laser spot size can cover the entire light receiving surface, or only a portion thereof. However, it can be advantageous to irradiate the full surface area of the light receiving surface in order to increase the input power of the device. The bandwidth and peak frequency of the emitted THz radiation will depend on the materials and construction of emitter. However, as illustrated in the Example, embodiments of the THz emitters described herein can provide THz emission with bandwidths smaller than 0.1 THz, including bandwidths smaller than 0.08 THz and bandwidths smaller than 0.06 THz (e.g., ~0.05 THz), and peak frequencies in the range from 0.1 to 1 THz. By way of illustration only, THz emission with bandwidths in the range from 0.005 to 0.05 THz can be achieved. Peak frequencies greater than 1 THz (for example, peak frequencies in the range from 1 THz to 2.5 THz) can also be achieved, although there may be a trade-off between peak frequency and power density at higher peak frequencies.

Figure 4:
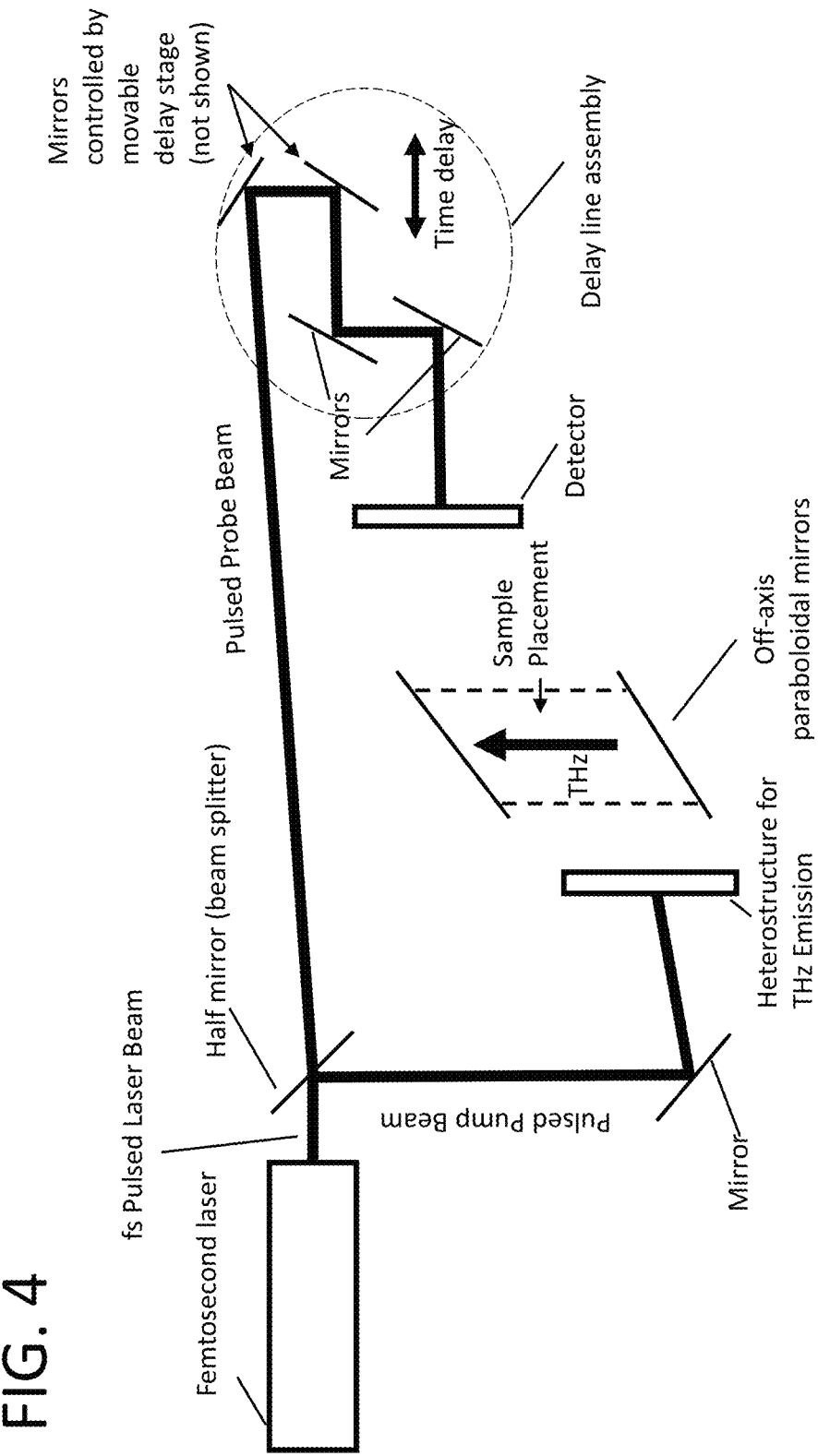
FIG. 4 is a schematic diagram of a THz time-domain spectrometer.

The THz emitters can be used as the THz radiation source in a THz-TDS system. THz-TDS is a spectroscopic technique for determining the properties of a sample, such as refractive index, dielectric constants, and/or absorption coefficients, by probing the sample with short pulses of terahertz radiation. One embodiment of a THz-TDS spectrometer is shown schematically in FIG. 4. The spectrometer includes a femtosecond pulsed laser that emits a pulsed laser beam and a beam splitter positioned in a path of the laser beam. The beam splitter splits the pulsed femtosecond laser beam into a pump beam and a probe beam. Common beam splitters include half-silvered mirrors, prism pairs, and dichroic mirrored prisms. A heterostructure of the type described herein is located in the path of the pump beam such that the femtosecond pulsed pump beam irradiates the light receiving surface of the heterostructure to generate a THz emission. Alternatively, a first femtosecond pulse laser can be used to generate the pump beam and a second femtosecond laser can be used to generate the probe beam. In this latter embodiment, the beam splitter can be omitted.

The sample to be studied is placed in the path of the THz emission and a THz detector is positioned to measure the THz radiation emitted from the heterostructure after it has passed through the sample or has been reflected from the surface of the sample. Photoconductive antennae and electro-optical crystals are examples of suitable detectors. Mirrors, such as parabolic mirrors can be used to guide the THz pulses from the heterostructure to the sample and then onto the THz detector. The probe beam is also directed onto the THz detector. A delay line assembly is configured in the path of the femtosecond pulsed probe beam to create an adjustable time delay in the probe beam and to direct the probe beam onto the terahertz detector. As shown FIG. 4, the delay line assembly may comprise a series mirrors from which the probe beam is reflected. One of more of the mirrors in the delay line assembly is controlled by a movable delay stage (e.g., a motorized delay stage) that allows for the adjustment of the probe beam path length.

During the operation of the spectrometer, the electric fields of the THz pulses having ps time scales interact with the probe laser pulses. This produces an electrical signal which is proportional to the electric field of the THz pulse. By varying the arrival time of the laser pulse with respect to the THz signal using the delay line assembly, the electric field amplitude and phase of the THz pulse can be mapped out as a function of time. Commercially available software can be used to collect the electric field amplitude as a function of time using a digital lock-in amplifier that measures the signal from the detector. This measured time-domain data can be transformed into frequency-domain spectra via a fast Fourier transform.

Because the spintronic THz emitters described herein are able to provide ultra-narrowband THz emission that is single-mode at high frequencies, the THz-TDS spectrometers provide very high spectral resolution and are able to distinguish between samples having central peak frequencies in their THz spectra that differ by 0.07 THz or less, and even those that differ by 0.06 or 0.05 THz or less.

EXAMPLE

In this example, the design of an acoustically mediated spintronic THz emitter which comprises a metal/dielectric/magnetic tri-layer heterostructure (FIG. 1A) is computationally demonstrated. Although a proposed theory of operation for the THz emitter is discussed below, it should be understood that the various aspects of the inventions described herein are not bound by the proposed theory.

The acoustically mediated emitter can convert an incident near-infrared (wavelength: 800 nm) fs laser into a narrowband (bandwidth: ~0.05) THz radiation. As shown in FIG. 1A, the fs laser irradiates the light-receiving surface of a metallic transducer, which injects a ps longitudinal acoustic strain pulse $\varepsilon_{zz}(t)$ into an adjacent dielectric layer. The process of injecting a ps acoustic strain pulse from fs laser irradiation was modelled by coupling the classical two-temperature model with the heat transport equation. (Tas, G. et al., *Phys. Rev. B* 49, 15046-15054 (1994); and Gusev, V. E. et al., Phys. Rev. B 57, 2878-2888 (1998).). The excitation of spin waves by the injected ps acoustic strain pulse was modelled using an in-house dynamic phase-field model that coupled magnetization dynamics with elastodynamics. The modeling results show that such a laser-induced ultra-fast acoustic pulse excites nominally single-mode, narrowband THz exchange spin waves in the adjacent magnetic film, which in turn leads to narrowband THz radiation. The magnitude of the computed emitted electric field $E_{THz}$ was on the order of $10^3 \sim 10^4$ V/m because of the large spatial variation of the excited exchange spin wave. The emission of electromagnetic wave from magnetic dipole radiation was modelled by numerically solving the Maxwell's equations. All in-house computer models mentioned above have been benchmarked against existing commercial or open-source software, confirming that all the modeling results are physically valid and numerically accurate.

Spin Wave Excitation and Mechanism

The Al (thickness: 10 nm)/MgO (thickness: 1200 nm)/$Fe_{79.5}Ga_{20.5}$ (thickness: 400 nm) heterostructure was selected as a model system for the acoustically mediated STE. Al was chosen because of its small absorption length to the near-infrared laser and large thermal expansion coefficient. The $Fe_{79.5}Ga_{20.5}$ (FeGa) film displays a strong magnetoelastic coupling and needs to be thick enough to allow for sufficient coupling between the injected elastic wave and the local magnetization vectors. The (001) MgO layer plays two roles. First, it acts as a thermal insulation layer to shield the FeGa film from the heat deposited into the Al transducer, thereby preventing heating from influencing the spin wave generation. Second, it provides a template for the epitaxial growth of (001) FeGa film.

Figure 1B:
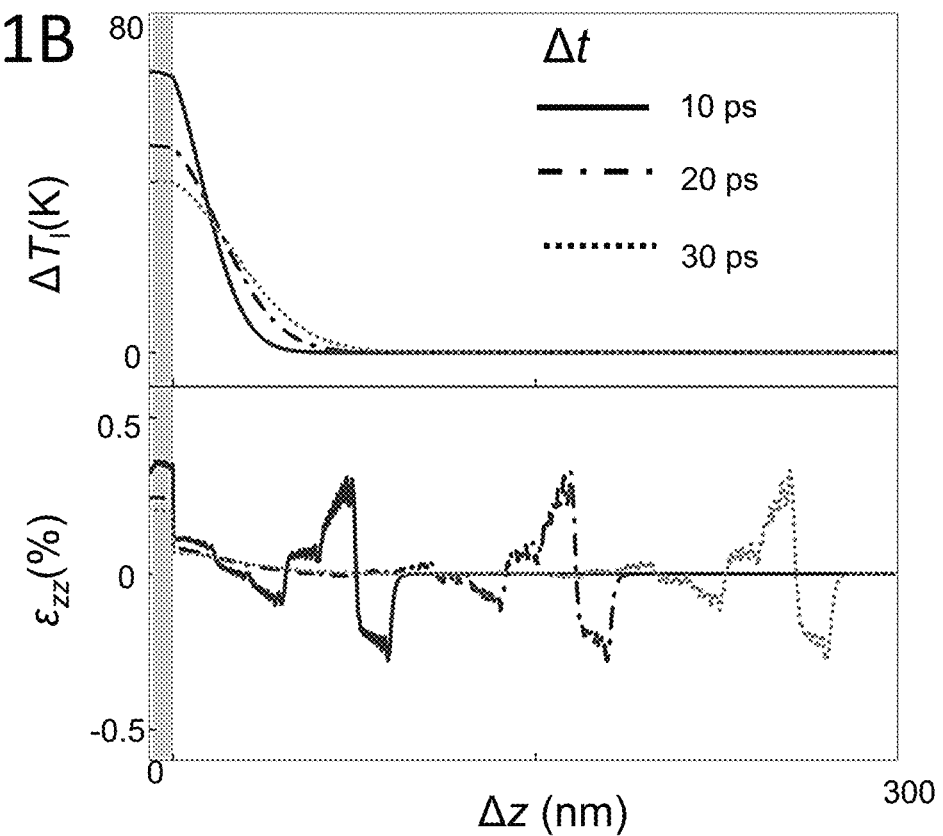
FIG. 1B shows the calculated profiles of lattice temperature $T_l$ and longitudinal strain $\varepsilon_{zz}$ along the thickness direction of the heterostructure of the Example at 10, 20, and 30 ps after irradiation.
Figure 1C:
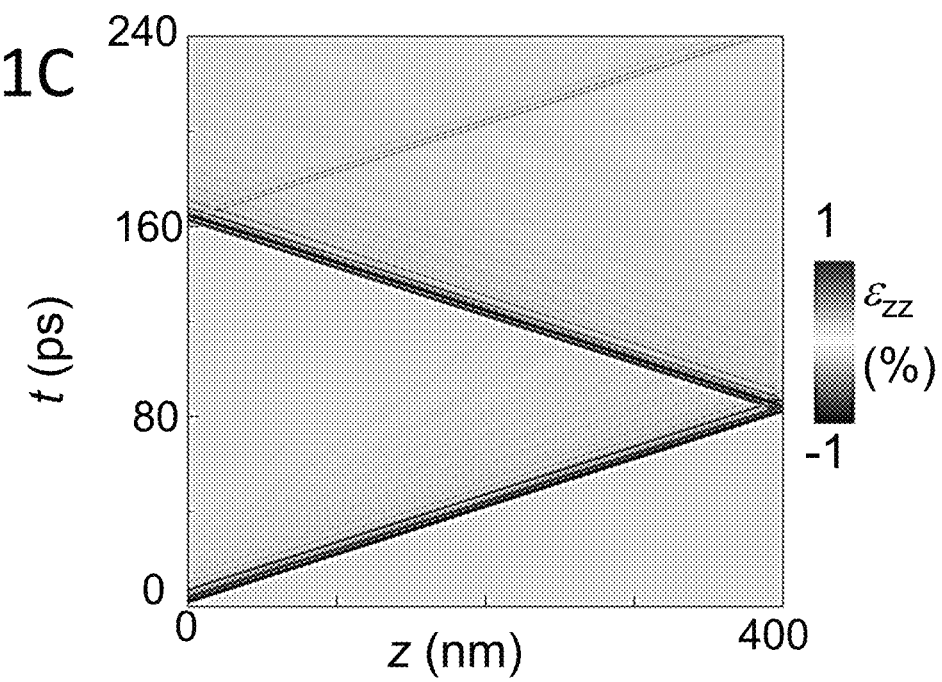
FIG. 1C shows an elastic wave in the magnetic layer of the heterostructure of the Example as a function of time.
Figure 1D:
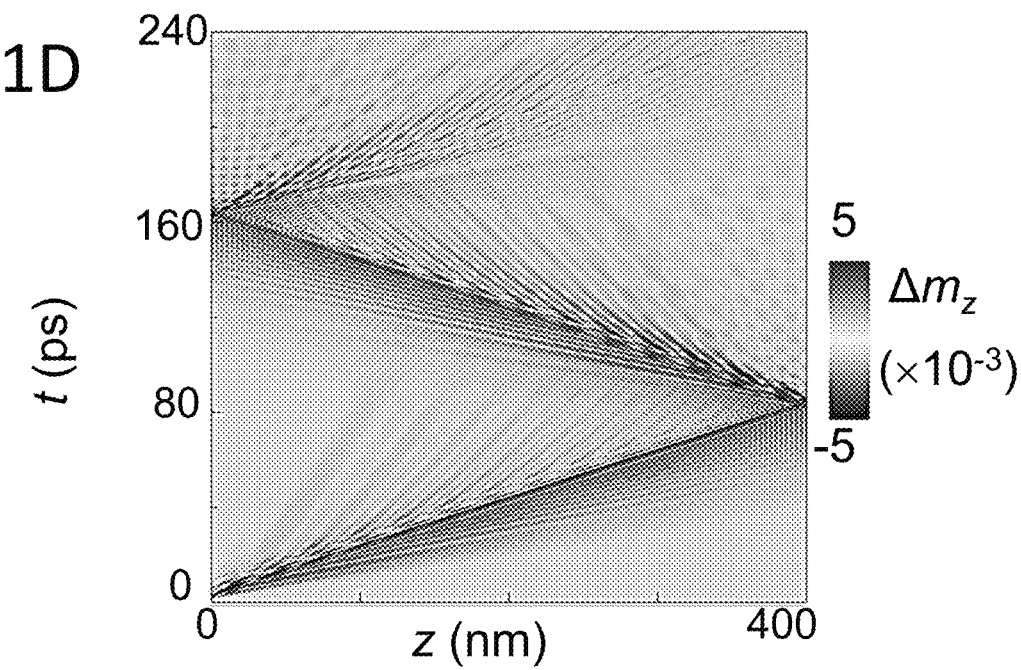
FIG. 1D shows a spin wave in the magnetic layer of the heterostructure of the Example as a function of time.

In the computation, the incident laser (wavelength: 800 nm; duration: 20 fs; absorbed pulse energy: 1.3 mJ/cm$^2$) irradiated the entire bottom surface of the Al. The Al film has an absorption length of ~7.86 nm to the 800-nm-wavelength laser light. Thus, a 10-nm-thick Al film should absorb the majority of incident photons. The laser-excited hot electrons then quickly exchanged energy with the phonons, leading to a rapid rise in the lattice temperature of Al. As a result, longitudinal elastic wave $\varepsilon_{zz}(t)$ was injected from the Al into the MgO substrate through the thermal expansion of Al. In parallel, heat transport from the hotter Al to the MgO began. FIG. 1B shows the calculated profiles of lattice temperature $T_1$ and longitudinal strain $\varepsilon_{zz}$ along the thickness direction of the heterostructure at 10, 20, and 30 ps after irradiation. The elastic wave $\varepsilon_{zz}(z, t)$ traveled into the FeGa. When the elastic wave reached the far surface of the 400-nm-thick FeGa film at 80 ps after it entered the FeGa, it was reflected. The majority of the elastic wave left the FeGa film at 180 ps, as shown in FIG. 1C. Accordingly, the elastically excited spin wave $\Delta m_z(z,t)$ was stronger within the time period of t=0-180 ps, as shown in FIG. 1D. Comparing FIGS. 1C and 1D more closely, it can be seen that the spin wave arrived at the far FeGa surface at t~40 ps, while the acoustic wave arrived at t~80 ps. This indicates the presence of additional mechanism(s) of spin wave excitation besides magnetoelastic coupling.

Figure 5A:
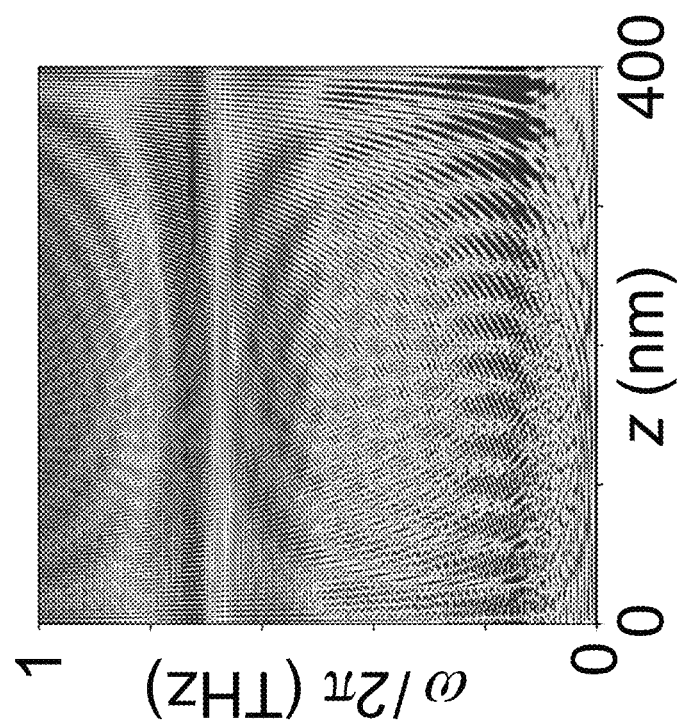
FIG. 5A shows the frequency spectra of the spin wave $\Delta m_z(z, t)$ in the magnetic layer of the heterostructure of the Example, where the frequency represents the precession frequency of local magnetization.
Figure 5F:
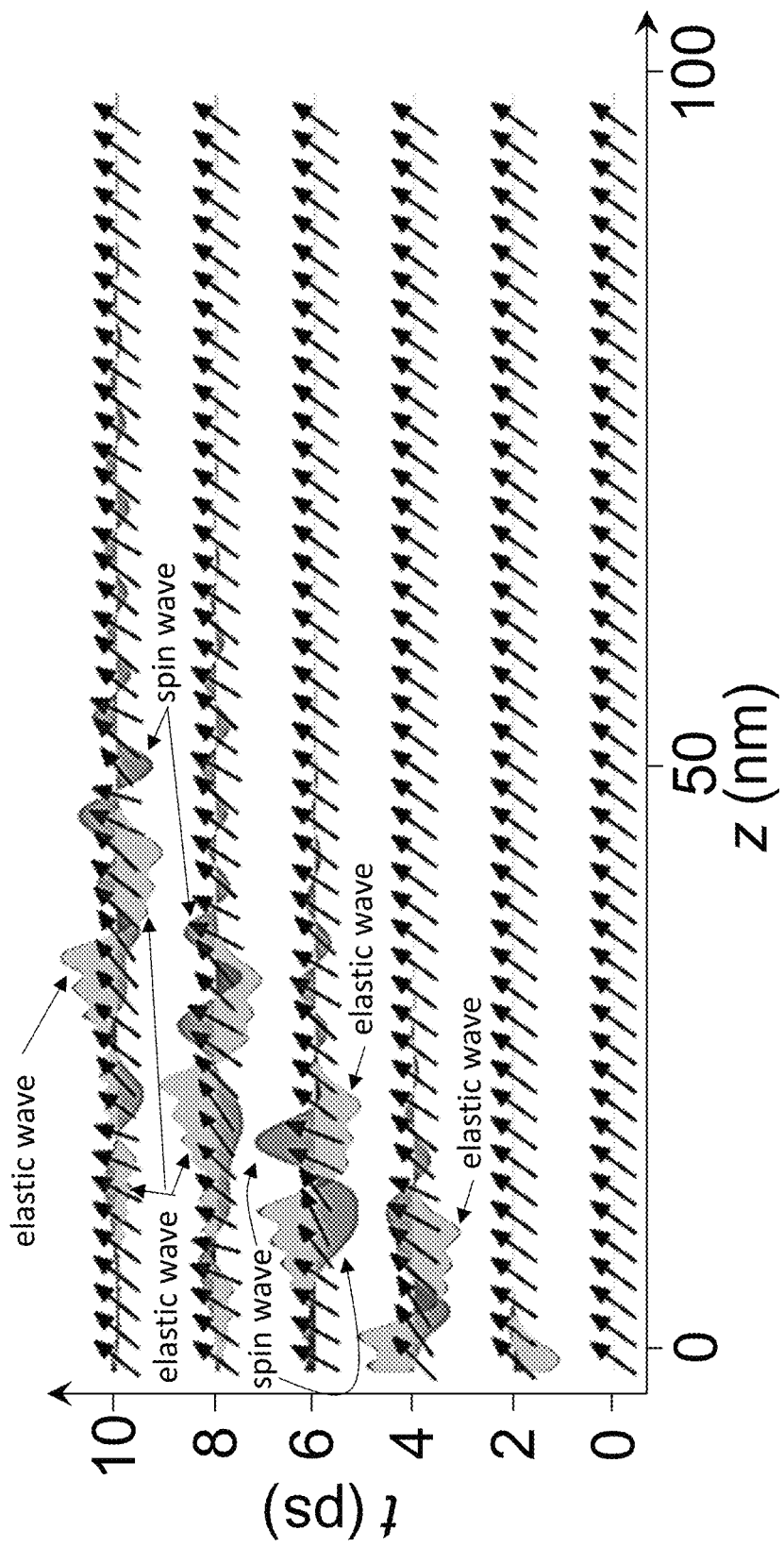
FIG. 5F shows real-space profiles of a spin wave and an elastic wave in the magnetic layer of the heterostructure of the Example within the first 10 ps after the elastic wave is injected into the magnetic layer, plotted with a 2-ps-interval.

FIG. 5A shows the frequency spectra of the spin wave $\Delta m_z(z,t)$, where the frequency represents the precession frequency of local magnetization. As shown in the figure, the precession frequencies were primarily distributed at frequencies of ~0.7 THz. From the spin wave spectrum at z=400 nm (FIG. 5B), it can be seen more clearly that there was only one peak (at 0.73 THz) in the frequency range of 0.5-1 THz with a narrow bandwidth of ~0.05 THz, and that the spectral power of this high-frequency peak was 1.6 times higher than that of the peaks in the low-frequency regime (which showed broadband, rather than narrowband, features).

For analyzing the mechanisms of spin wave excitation, 2D fast Fourier transform (FFT) of the spin wave $\Delta m_z(z,t)$ was performed to obtain the spin wave dispersion relation, which displayed both a linear and parabolic curve. As shown in FIG. 5C, the linear frequency-wavenumber relation $\omega(k)$ fits the analytical formula $\omega=v_s k$ (dashed straight line), where $v_s$ is the longitudinal sound velocity in FeGa. This means that all the spin wave components traveled at the same phase velocity as the velocity of the elastic wave, indicating a pure magnetoelastic excitation mechanism, namely, magnetoelastic spin waves. For clarification, a control simulation was performed by setting the exchange coupling coefficient $A_{ex}$ to be zero. As shown in FIG. 5D, the simulated $\omega(k)$ displayed an expected linear relation $\omega=v_s k$, and the precession frequency of local magnetization remained below 0.5 THz due to the relatively low frequency of the driving elastic waves.

The parabolic relation $\omega(k)$ shown in FIG. 5C fits the analytical formula $$\omega = \frac{\gamma}{1+\alpha^2} \frac{2A_{ex}}{\mu_0 M_s} k^2$$

(dashed curve), which was derived by linearizing the magnetization dynamics equation in the presence of only the magnetic exchange coupling field $H^{exch}$. Here, $\gamma$ is the gyromagnetic ratio; $\alpha$ is the damping coefficient; $\mu_0$ is the vacuum permeability; and $M_s$ is the saturation magnetization. Therefore, spin waves displaying such parabolic frequency dispersion relation were excited by exchange coupling, namely, exchange spin waves. First, it was demonstrated that the low-frequency (<0.5 THz) exchange spin waves were those which did not interact with the elastic wave. To that end, 2D FFT was performed for the simulated $\Delta m_z(z,t)$ over the time period from t=200 ps to t=480 ps, during which there were no strong elastic waves in the FeGa. The resultant $\omega(k)$, as plotted in FIG. 5E, well matches the analytically derived parabolic relation, and the precession frequencies were all below 0.5 THz.

It was then demonstrated that the high-frequency exchange spin waves, by contrast, arose due to the strong interaction with the elastic waves. Specifically, once the magnetization vector at the near surface of the FeGa (z=0) was reoriented by the incoming elastic wave via magnetoelastic coupling, the nearest magnetization vector was subsequently reoriented by the $H^{exch}$, and so forth, for the second nearest magnetization vector, leading to the excitation of an exchange spin wave. As the elastic wave propagated across the FeGa, it rotated the magnetization vector via magnetoelastic coupling and thereby triggered the excitation of exchange spin waves from different locations. The phase velocity of these elastically initiated exchange spin waves, given by $$v_p = \omega^*/k^* = \frac{\gamma}{1+\alpha^2} \frac{2A_{ex}}{\mu_0 M_s} k^*,$$

was equal to the velocity of the elastic wave (sound velocity $v_s$). This allowed for the derivation of the analytical formulae of the wavenumber $k^*$ and center frequency $f^*$, $$k^* = \frac{v_s}{2\pi} \frac{1+\alpha^2}{\gamma} \frac{\mu_0 M_s}{2A_{ex}}; f^* = \frac{v_s^2}{2\pi} \frac{1+\alpha^2}{\gamma} \frac{\mu_0 M_s}{2A_{ex}}. \quad (1)$$

In FeGa, $v_s=\sqrt{c_{11}/\rho}$=4974 m/s, where $c_{11}$ and $\rho$ are the elastic stiffness coefficient and mass density, respectively. Plugging in the numbers of other parameters, one has $k^*$~147.42 $\mu m^{-1}$ and $f^*$~0.73 THz, which was exactly the center frequency of the high-frequency peak in the simulated $\omega(k)$ (also see FIG. 5B). The group velocity $v_g$ of these elastically initiated exchange spin waves, given by $v_g=\partial\omega/\partial k|_{k=k^*}$ was calculated to be 9948 m/s. This is exactly twice the group velocity of the elastic wave (that is, the sound velocity $v_s$), and is consistent with the simulated real-space spin wave profile: it took ~40 ps ($\approx$400 nm/9948 m/s) for the spin wave to arrive at the far surface of FeGa (FIG. 1D), while the arrival of the elastic wave took ~80 ps (FIG. 1C). The process of launching such high-frequency exchange spin waves from the frontmost position of the travelling elastic wave in the FeGa is shown more clearly in FIG. 5F, where the real-space profiles of the spin wave and the elastic wave within the first 10 ps are plotted with a 2-ps-interval.

THz Radiation from THz Exchange Spin Waves

Figure 6A:
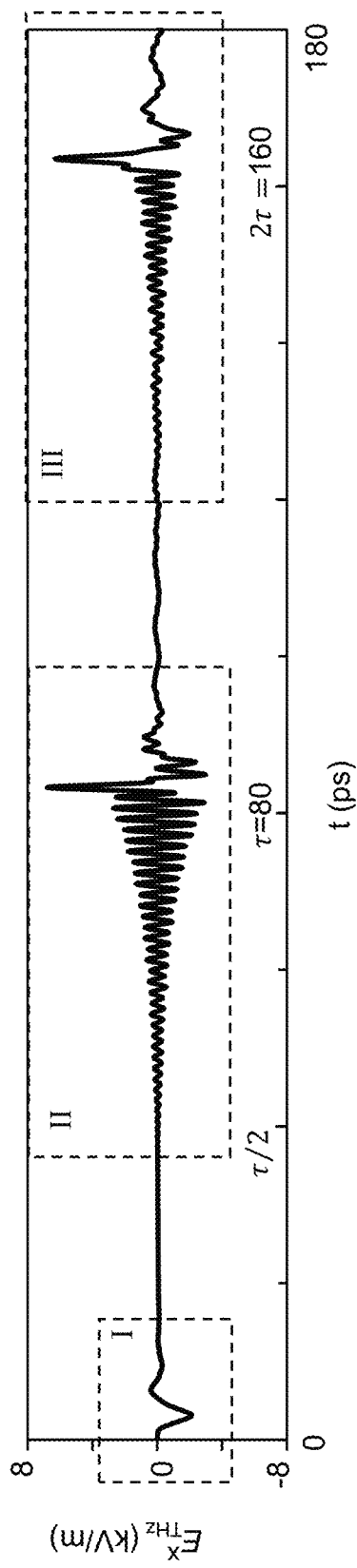
FIG. 6A shows the calculated electric field component $E_{THz}^x(t)$ at the far surface of the magnetic layer of the heterostructure of the Example, which has three distinct wave packets over the time span 180 ps.
Figure 6B:
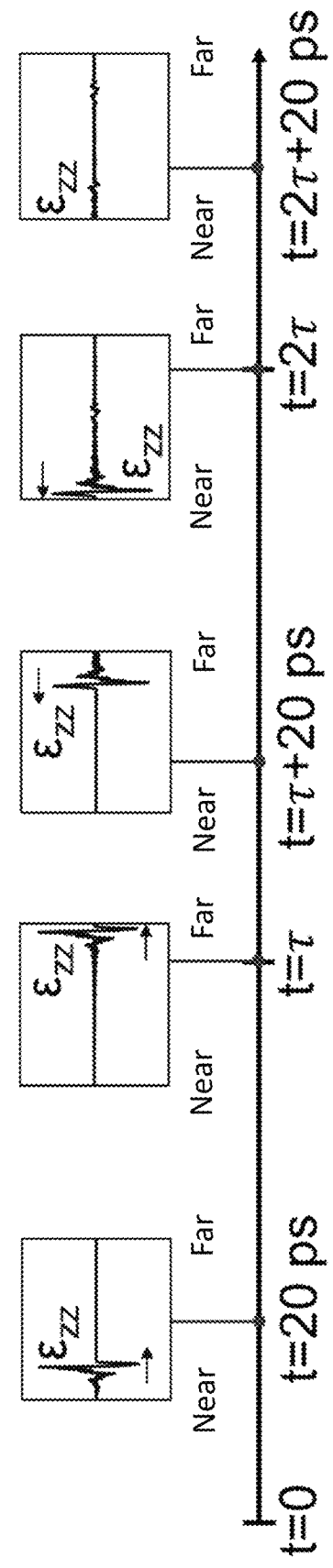
FIG. 6B shows the spatial profiles of the elastic wave $\varepsilon_{zz}(z, t)$ in the magnetic layer of the heterostructure of the Example at a few key moments.

The excitation and propagation of THz spin waves led to the emission of THz electromagnetic waves due to magnetic dipole radiation. FIG. 6A shows the calculated electric field component $E_{THz}^x(t)$ above the FeGa far surface, which shows three distinct wave packets over the time span of $2\tau+20$ ps, where $\tau=80$ ps was the time it took the elastic wave to travel from the near to the far surface of the FeGa film. FIG. 6B shows the spatial profiles of the elastic wave $\epsilon_{zz}(z,t)$ in the FeGa at a few key moments. Comparing FIGS. 6A and 6B, it can be seen that the first wave packet of $E_{THz}^x(t)$ (I) spanned a time period from the moment $\epsilon_{zz}(z,t)$ entered the FeGa near surface (t=0 ps) to the moment the entire waveform of $\epsilon_{zz}(z, t)$ passed through the near surface (t=20 ps). The THz radiation resulted from the low-frequency magnetoelastic spin waves near the FeGa near surface (z=0), as demonstrated by the high similarity between the time-domain waveforms of $E_{THz}^x(t)$ and $\Delta m_y(z=0,t)$ within t=0-20 ps (c.f., FIGS. 6A and 6C). As discussed previously, the traveling elastic wave excited both the low-frequency (<0.5 THz) magnetoelastic spin waves and the high-frequency (~0.7 THz) exchange spin waves in the FeGa. The spatial profiles of such mixed-mode spin waves at a few key moments are shown on the lower half of FIG. 6C; see $\Delta m_y(z,t=20$ ps) as an example. Note that the forward propagation of such a spin wave within t=20-40 ps (i.e., before it arrived at the FeGa far surface) did not produce appreciable radiation, as shown in FIG. 6A. In the front section of such a spin wave, the magnitude of $\Delta m_y$ was relatively small, leading to a relatively small spatial gradient $\partial_z m_y$ and hence weak $E_{THz}^x$. In the back section of the spin wave, although the magnitude of $\Delta m_y$ was larger, its waveform remained almost the same and it travels forward at a constant speed that is equal to the sound velocity of FeGa during propagation, so that it cannot emit electromagnetic waves.

Figure 6C:
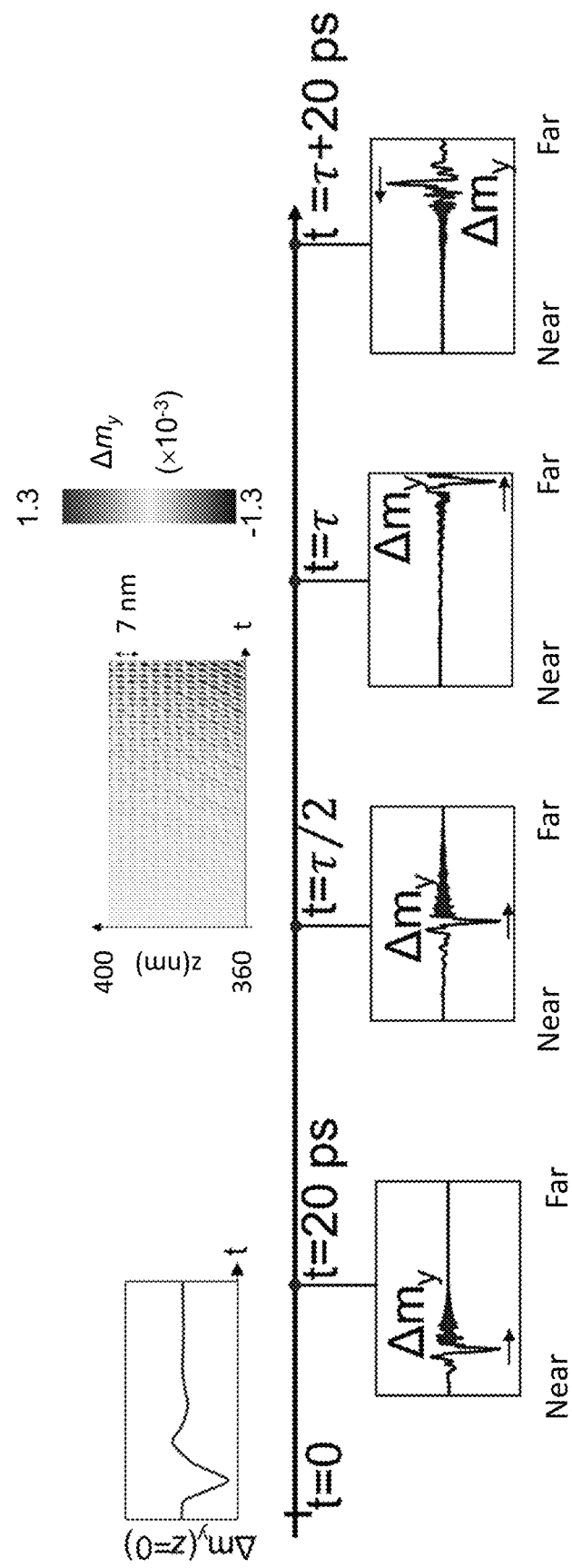
FIG. 6C shows the spatial profiles of a mixed-mode (i.e., high-frequency and low frequency) spin waves in the magnetic layer of the heterostructure of the Example at a few key moments.
Figure 7A:
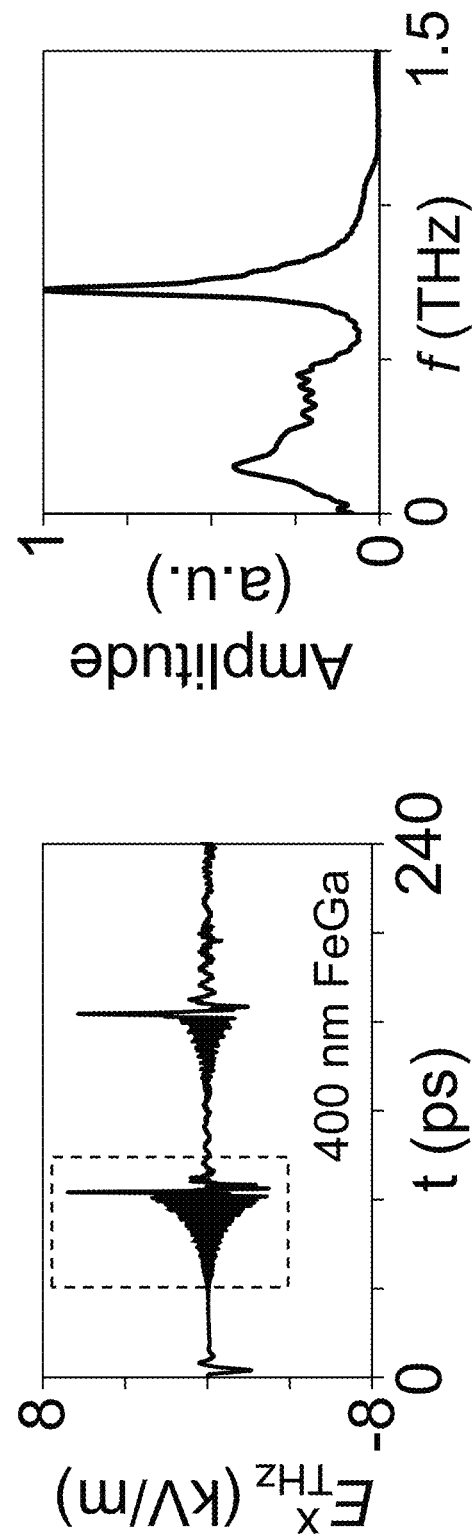
FIG. 7A shows the calculated electric field component $E_{THz}^x(t)$ at the far surface of the magnetic layer of a heterostructure in its left panel, and the frequency spectrum of the second wave packet (highlighted using a dashed rectangle in the left panel) of the electric field in the right panel. In this example, the magnetic layer is FeGa and has a thickness of 400 nm.
Figure 7B:
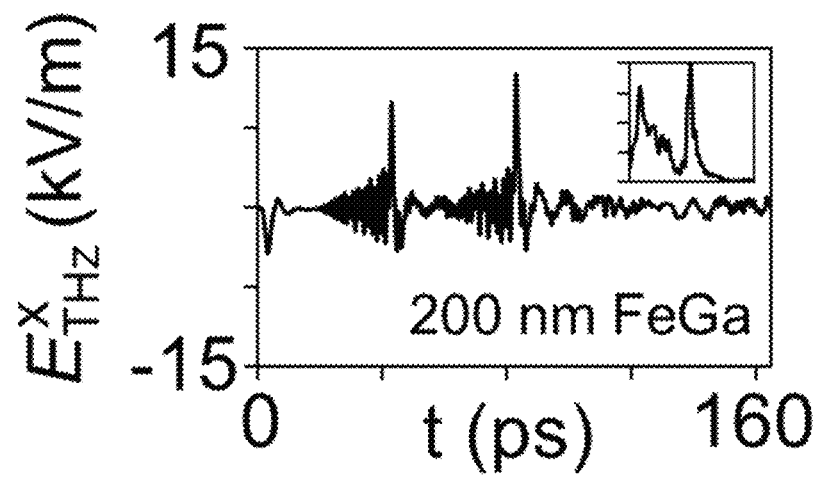
FIG. 7B shows the calculated electric field component $E_{THz}^x(t)$ at the far surface of the magnetic layer of a heterostructure, and (in the inset) the frequency spectrum of the second wave packet (from 20 ps to 60 ps) of the electric field. In this example, the magnetic layer is FeGa and has a thickness of 200 nm.
Figure 7C:
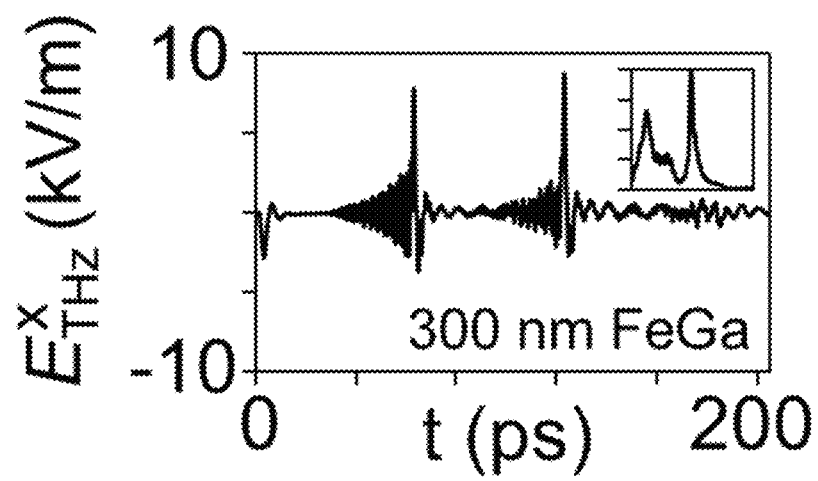
FIG. 7C shows the calculated electric field component $E_{THz}^x(t)$ at the far surface of the magnetic layer of a heterostructure, and (in the inset) the frequency spectrum of the second wave packet (from 30 ps to 80 ps) of the electric field. In this example, the magnetic layer is FeGa and has a thickness of 300 nm.
Figure 7D:
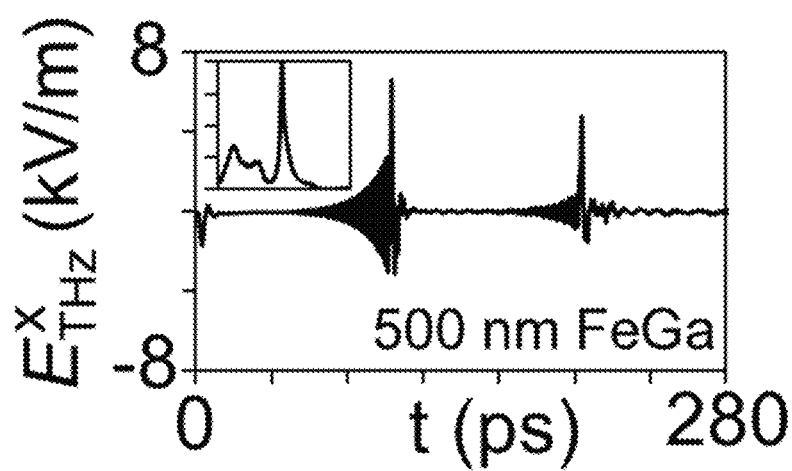
FIG. 7D shows the calculated electric field component $E_{THz}^x(t)$ at the far surface of the magnetic layer of a heterostructure, and (in the inset) the frequency spectrum of the second wave packet (from 50 ps to 120 ps) of the electric field. In this example, the magnetic layer is FeGa and has a thickness of 500 nm.

The second wave packet of $E_{THz}^x(t)$ (II) spanned a time period from the moment the spin wave $\Delta m_y(z,t)$ arrived at the far surface of the FeGa ($t=\tau/2=40$ ps) to the moment the elastic wave $\varepsilon_{zz}(z,t)$ completely reflected from the far surface ($t=\tau+20=100$ ps). As shown in FIG. 6A, the second wave packet of $E_{THz}^x(t)$ comprised a monochromic high-frequency phase (40-80 ps) and a non-monochromic low-frequency phase (80-100 ps). In the first phase, the elastic wave had not yet arrived at the FeGa far surface; the radiation arose from the high-frequency standing spin wave that formed due to the interference between the incident and reflected spin waves. This process can be seen from the spatiotemporal profile of the $\Delta m_y(z,t)$ near the FeGa far surface (z=360-400 nm) within t=40-72 ps, in FIG. 6C. The wavelength of the standing spin wave was ~7 nm, which is consistent with the analytical wavenumber of the exchange spin wave (Eq. 1), $k^* \sim 147.42$ $\mu m^{-1}$. As the magnitude of the standing spin wave increased, the magnitude of $E_{THz}^x(t)$ increased accordingly. In the second phase (80-100 ps), the reflection of the elastic wave from the FeGa far surface (starting from $t=\tau=80$ ps, ending at $t=\tau+20=100$ ps) caused an abrupt flipping of the waveform of the spin wave $\Delta m_y(z,t)$, as shown in FIG. 6C. This led to a sudden increase in the spatial gradient $\partial_z M_y$, which in turn led to a spike (~6.7 kV/m) in the emitted $E_{THz}^x(t)$ at around t=80 ps.

The third wave packet of $E_{THz}^x(t)$ (III) spanned a time period from the moment the backward-propagating (reflected) spin wave $\Delta m_y(z,t)$ arrived at the near surface of the FeGa layer (t=120 ps) to the moment the elastic wave $\varepsilon_{zz}(z,t)$ completely traveled across the near surface and out of the FeGa layer ($t=2\tau+20=180$ ps). The mechanism of THz emission for the third wave packet was the same as that of the second wave packet. Because the source of radiation was at the FeGa near surface in this case, the absorption and reflection of the electric field by the metallic FeGa reduced the magnitude of $E_{THz}^x(t)$, which was sampled at above the FeGa far surface (z>400 nm).

FIG. 6D shows the frequency spectrum of the first wave packet of the $E_{THz}^x(t)$. The broadband and low-frequency nature of the spectrum demonstrates again that the first wave packet was caused by the low-frequency magnetoelastic spin waves. FIG. 6E shows the frequency spectrum of the second wave packet of the $E_{THz}^x(t)$, which clearly reveals a single peak at 0.725 THz with a narrow bandwidth of 0.058 THz. This corresponds to the high-frequency exchange spin wave in the first phase (40-80 ps). The broadband feature of the spectrum was caused by the lower-frequency spin wave components in the second phase (80-100 ps). By integrating the square of the spectral power over the entire frequency span (0-1.5 THz) and over the high-frequency regime (0.645~0.891 THz) in FIG. 6E, it was found that the energy possessed by the high-frequency wave components constituted about 57% of the total energy of the emitted electromagnetic waves. In other words, the energy of the radiation largely concentrated at sub-THz frequencies. FIG. 6F shows the frequency spectrum of the third wave packet of the $E_{THz}^x(t)$, which has a single peak at 0.723 THz with bandwidth of 0.056 THz. However, the amplitude of this high-frequency peak is smaller relative to the low-frequency peaks. Specifically, the energy possessed by the high-frequency wave components (0.645~0.891 THz) constituted about 17% of the total energy of the third wave packet of the $E_{THz}^x(t)$. This is again because the emitted electric field was sampled at the far surface of the FeGa while the source of radiation was at the FeGa near surface. Although both the low-frequency and high-frequency electromagnetic waves were absorbed when they travel across the FeGa, the absorption of the high-frequency waves, which have shorter wavelength (hence shorter absorption length too), is more significant. Had the emitted $E_{THz}^x(t)$ been measured in the free space at above the FeGa near surface, the spectral features of the $E_{THz}^x(t)$ would be very similar to that of the second wave packet.

The effect of the magnetic layer thickness on THz emission was studied. The temporal profile of the calculated electric field component $E_{THz}^x(t)$ with a FeGa thickness of 400 nm, 200 nm, 300 nm, and 500 nm are shown in FIGS. 7A-D, respectively. Two key observations were made. First, the magnitude of the $E_{THz}^x(t)$ decreases as the FeGa thickness increases, because absorption of the electromagnetic wave is stronger in thicker FeGa. Second, the duration of the high-frequency (that is, the single peak at ~0.7 THz) $E_{THz}^x(t)$ is longer in thicker FeGa, because the time interval between the arrival of the high-frequency spin wave and the subsequent arrival of the elastic wave at the FeGa far surface is longer. As a result, the amplitude of the high-frequency peak (~0.7 THz, see FIG. 7A and the insets of FIGS. 7B-D) is larger in thicker FeGa with respect to the low-frequency peaks. The center frequencies and bandwidths of the high-frequency peaks in the spectra of FIGS. 7A-D are summarized in Table 2, along with the average power density of the second packet of the emitted electromagnetic wave. As seen, varying the FeGa thickness within the range of 200-500 nm barely alters the center frequency and the bandwidth, because of the identical physical mechanisms of emission. However, the average power density decreases as FeGa thickness increases due to the stronger absorption.

Computations were also performed for a THz emitter with the heterostructure design shown in FIG. 2 having a PDMS layer with a thickness of at least 1200 nm (PDMS (thickness: 1200 nm)/Al/MgO/FeGa). The obtained results are very similar to the device structure of Al/MgO/FeGa discussed above. This is mainly because the PDMS, which is mechanically soft (its elastic stiffness is four orders of magnitude smaller than that of Al) and has a low heat conductivity (two orders of magnitude smaller than Al and MgO), has negligible impact on the laser-induced generation of ps acoustic strain pulses. Thus, the subsequent excitation of spin wave and emission of electromagnetic wave both remain virtually unaffected.

Finally, computations were performed for a THz emitter with the heterostructure design shown in FIG. 3 having an MgO substrate thickness of at least 1200 nm (Al/MgO/FeGa/MgO (thickness 1200 nm) where the MgO substrate layer was a thick single-crystal that can promote the epitaxial growth of the FeGa layer. MgO is also transparent to the Thz radiation. The device performance as a function of FeGa thickness is summarized in Table 3. In such Al/MgO/FeGa/MgO heterostructure (FIG. 3), the laser-induced elastic wave takes approximately a one-way trip from the Al/MgO interface (source) to the thick MgO substrate layer (sink). This is different from the case of an Al/MgO/FeGa tri-layer, where the elastic wave is reflected at the far surface of the FeGa. As a result, the $E_{THz}^x(t)$ emitted from the Al/MgO/FeGa/MgO structure (FIG. 3) displays two different features from that in the Al/MgO/FeGa tri-layer (FIG. 1A). First, the peak amplitude of the $E_{THz}^x(t)$ is larger in the Al/MgO/FeGa/MgO structure, which leads to enhanced output power (c.f., Tables 2 and 3). Second, there are only two wave packets in the time-domain profile of $E_{THz}^{x}(t)$. Because the waveform of these two packets are very similar to the wave packet I and II in FIG. 6A, they are not shown here for brevity.

TABLE 2

Computed THz Emission Characteristics of THz Emitters have the Design of FIG. 1A and FIG. 2.

| FeGa thickness (nm) | Peak frequency (THz) | Bandwidth(THz) | Average power density (W/m$^2$) |
|---|---|---|---|
| 10 | N/A (Magnitude of high-frequency component is small and lasting time is short) | | |
| 50 | | | |
| 100 | | | |
| 200 | 0.739 | 0.07 | 8085.8 |
| 300 | 0.726 | 0.05 | 4053.9 |
| 400 | 0.725 | 0.05 | 2669.2 |
| 500 | 0.723 | 0.05 | 2294.1 |

TABLE 3

Computed THz Emission Characteristics of THz Emitters have the Design of FIG. 1A and FIG. 3

| FeGa thickenss (nm) | Peak frequency (THz) | Bandwidth(THz) | Average power density (W/m$^2$) |
|---|---|---|---|
| 10 | N/A | | |
| 50 | | | |
| 100 | | | |
| 200 | 0132 | 0.07 | 12292 |
| 300 | 0.726 | 0.05 | 5445.2 |
| 400 | 0.726 | 0.05 | 3431.9 |
| 500 | 0.723 | 0.05 | 2747.8 |

Magnetic Exchange Coupling

The effect of the magnetic exchange coupling coefficient $A_{ex}$ was also studied. Simulations with $A_{ex}$ values in the range from 6 pJ/m to 38 pJ/m were performed, the rest of the material parameters were fixed. All simulations were performed for a THz emitter with the design shown in FIG. 1A [Al(thickness:10 nm)/MgO(thickness:1200 nm)/FeGa (thickness:400 nm)]. Because the waveforms of the calculated $E_{THz}^{x}(t)$ were similar to that shown in FIG. 7A, except the magnitude, they are not shown here for brevity. The center (peak) frequencies and bandwidths of the high-frequency (>0.3 THz) peaks are summarized in Table 4, along with the average power density of the second wave packet of the emitted electromagnetic wave. As seen, increasing $A_{ex}$ decreases the peak frequency, which is consistent with the equation (1) shown above. As the $A_{ex}$ increases, the bandwidth of the high-frequency peak decreases while the average power density increases. This is because a larger $A_{ex}$ leads to a larger magnitude of the exchange spin wave, which enhances both the magnitude and the duration of the high-frequency components of the $E_{THz}^{x}(t)$. For practical applications, $A_{ex} > 10$ pJ/m will be preferred to achieve an average power density of the emitted electromagnetic wave of greater than $10^3$ W/m$^2$.

TABLE 4

Peak Frequencies and Bandwidths.

| $A_{ex}$ (pJ/m) | Peak frequency (THz) | Bandwidth (THz) | Average power density (W/m$^2$) |
|---|---|---|---|
| 6 | 2.19 | 0.14 | 608.77 |
| 10 | 1.31 | 0.08 | 740.15 |
| 14 | 0.93 | 0.06 | 3258.94 |
| 18 (Used in the rest of this Example) | 0.73 | 0.05 | 2669.20 |
| 22 | 0.59 | 0.04 | 2348.60 |
| 26 | 0.49 | 0.04 | 10070.75 |
| 30 | 0.43 | 0.04 | 23834.87 |
| 34 | 0.38 | 0.03 | 26745.79 |
| 38 | 0.34 | 0.04 | 30990.77 |

The effect of the magnetoelastic coupling coefficient Bi also was studied. Simulations with Bi in the range from $-0.57 \times 10^6$ J/m$^3$ to $-45.6 \times 10^6$ J/m$^3$ were performed; the rest of the material parameters were fixed. All simulations were performed for a THz emitter with the design shown in FIG. 1A [Al(thickness:10 nm)/MgO(thickness:1200 nm)/FeGa (thickness:400 nm)]. Because the waveforms of the calculated $E_{THz}^{x}(t)$ were similar to that shown in FIG. 7A, except the magnitude, they are not shown here for brevity. The center (peak) frequencies and bandwidths of the high-frequency (0.73 THz) peaks are summarized in Table 5, along with the average power density of the second wave packet of the emitted electromagnetic wave. As seen, varying Bi does not alter the peak frequency and the bandwidth; but the average power density increases as the absolute value of $B_1$ becomes larger. Since larger $|B_1|$ means stronger interaction between elastic strain and spin via magnetoelastic coupling, the magnitude of the excited spin waves (including both magnetoelastic and exchange spin wave) is larger, and so for the magnitude of $E_{THz}^{x}(t)$. For practical applications, $|B_1| \geq 5.7 \times 10^6$ J/m$^3$ will be preferred to achieve an average power density of the emitted electromagnetic wave is greater than $10^3$ W/m$^2$.

TABLE 5

Peak Frequencies and Bandwidths.

| $B_1$ ($\times 10^6$ J/m$^3$) | Peak frequency (THz) | Bandwidth (THz) | Average power density (W/m$^2$) |
|---|---|---|---|
| -0.57 | 0.73 | 0.05 | 11.83 |
| -2.85 | 0.73 | 0.05 | 295.98 |
| -5.70 | 0.73 | 0.05 | 1185.44 |
| -8.55 (Used in the rest of this Example) | 0.73 | 0.05 | 2669.20 |
| -11.40 | 0.73 | 0.05 | 4753.95 |
| -22.80 | 0.73 | 0.05 | 19116.35 |
| -34.20 | 0.73 | 0.05 | 43246.91 |
| -45.60 | 0.73 | 0.05 | 77316.80 |

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention.

The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A heterostructure comprising:
   a transducer layer having a light receiving surface and consisting of a metal selected from the group consisting of aluminum, iron, platinum, gold, cobalt, and nickel;
   a thermal insulation layer adjacent to a surface of the transducer layer opposite the light receiving surface; and
   a magnetic layer comprising a ferromagnetic or ferrimagnetic material adjacent to a surface of the thermal insulation layer opposite the transducer layer, such that the thermal insulation layer is disposed between the transducer layer and the magnetic layer, the magnetic layer having an exchange coupling coefficient of at least 10 pJ m$^{-1}$ and magnetoelastic coupling coefficient with an absolute value of at least $5 \times 10^6$ J m$^{-1}$.

2. The heterostructure of claim 1, wherein the magnetic layer has a thickness of at least 200 nm.

3. The heterostructure of claim 2, wherein the magnetic layer has a thickness in the range from 200 nm to 1 μm.

4. The heterostructure of claim 1, wherein the magnetic layer is a layer of Fe, a layer of Co, a layer of Ni, a layer of an FeGa alloy, a layer of a CoFe alloy, a layer of a CoFeB alloy, a layer of a TbDyFe alloy, a layer of $Fe_3O_4$, a layer of a cobalt ferrite, a layer of yttrium iron garnet, or a layer of thulium iron garnet.

5. The heterostructure of claim 1, wherein the thermal insulation layer comprises MgO, $Al_2O_3$, $Ga_2O_3$, GaAs, $Gd_2O_3$, $HfO_2$, or $SrTiO_3$.

6. The heterostructure of claim 1, wherein the thermal insulation layer is a layer of magnesium oxide, the magnetic layer is a layer of an FeGa alloy, a CoFeB alloy, or a CoFe alloy, and the transducer layer is a layer of aluminum or iron.

7. The heterostructure of claim 6, wherein the magnetic layer has a thickness of at least 200 nm.

8. A terahertz radiation source comprising:
   (a) a heterostructure comprising:
      (i) a light-to-acoustic transducer layer having a light receiving surface;
      (ii) a thermal insulation layer adjacent to a surface of the light-to-acoustic transducer layer opposite the light receiving surface; and
      (iii) a magnetic layer comprising a ferromagnetic or ferrimagnetic material adjacent to a surface of the thermal insulation layer opposite the transducer layer, such that the thermal insulation layer is disposed between the transducer layer and the magnetic layer; and
   (b) a femtosecond pulse laser positioned to direct femtosecond laser pulses onto the light receiving surface of the transducer layer.

9. The terahertz radiation source of claim 8, wherein the magnetic layer has a thickness of at least 200 nm.

10. The terahertz radiation source of claim 9, wherein the magnetic layer has a thickness in the range from 200 nm to 1 μm.

11. The terahertz radiation source of claim 8, wherein the light-to-acoustic transducer layer is a layer of aluminum, iron, platinum, gold, cobalt, or nickel.

12. The terahertz radiation source of claim 8, wherein the thermal insulation layer is a layer of magnesium oxide and the magnetic layer is a layer of an FeGa alloy, a CoFeB alloy, or a CoFe alloy.

13. The terahertz radiation source of claim 12, wherein the transducer layer is a layer of aluminum or a layer of iron.

14. A method of generating THz radiation using a terahertz radiation source comprising:
   (a) a heterostructure comprising:
      (i) a light-to-acoustic transducer layer having a light receiving surface;
      (ii) a thermal insulation layer adjacent to a surface of the transducer layer opposite the light receiving surface; and
      (iii) a magnetic layer comprising a ferromagnetic or ferrimagnetic material adjacent to a surface of the thermal insulation layer opposite the transducer layer, such that the thermal insulation layer is disposed between the transducer layer and the magnetic layer; and
   (b) a femtosecond pulse laser positioned to direct femtosecond laser pulses onto the light receiving surface of the transducer layer, the method comprising:
   irradiating the light receiving surface of the transducer layer with femtosecond laser pulses from the femtosecond pulse laser, thereby generating THz radiation emission from the magnetic layer.

15. The method of claim 14, wherein the magnetic layer has a thickness of at least 200 nm.

16. The method of claim 15, wherein the magnetic layer has a thickness in the range from 200 nm to 1 μm.

17. The method of claim 14, wherein the light-to-acoustic transducer layer is a layer of aluminum, iron, platinum, gold, cobalt, or nickel.

18. The terahertz radiation source of claim 14, wherein the thermal insulation layer is a layer of magnesium oxide and the magnetic layer is a layer of an FeGa alloy, a CoFeB alloy, or a CoFe alloy.

19. The method of claim 18, wherein the transducer layer is a layer of aluminum or a layer of iron.

20. A terahertz time-domain spectrometer comprising:
   a femtosecond pulse laser that emits a pulsed femtosecond laser beam;
   a beam splitter in a path of the pulse femtosecond laser beam, wherein the beam splitter splits the pulsed femtosecond laser beam into a pump beam and a probe beam;
   the heterostructure comprising:
      a light-to-acoustic transducer layer having a light receiving surface;
      a thermal insulation layer adjacent to a surface of the transducer layer opposite the light receiving surface; and
      a magnetic layer comprising a ferromagnetic or ferrimagnetic material adjacent to a surface of the thermal insulation layer opposite the transducer layer, such that the thermal insulation layer is disposed between the transducer layer and the magnetic layer;
   a terahertz detector, configured to detect a terahertz pulse output signal emitted from the magnetic layer; and
   a delay line assembly configured in the path of the probe beam to create an adjustable time delay in the probe beam and to direct the probe beam onto the terahertz detector.

* * * * *

UNITED STATES PATENT AND TRADEMARK OFFICE
CERTIFICATE OF CORRECTION

PATENT NO. : 11,199,447 B1
APPLICATION NO. : 17/074756
DATED : December 14, 2021
INVENTOR(S) : Jiamian Hu et al.

Page 1 of 1

It is certified that error appears in the above-identified patent and that said Letters Patent is hereby corrected as shown below:

In the Specification

Column 2, Line 51:
Delete the phrase "the obtained co ($k$) relation" and replace with --the obtained $\omega(k)$ relation--.

Column 2, Lines 58-59:
Delete the phrase "$\omega = \gamma / 1 + \alpha^2\ 2A_{ex}/\mu_0 M_s\ k^2$." and replace with -- 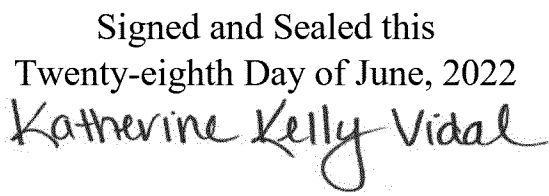 --.

Column 11, Line 44:
Delete the phrase "a is the damping coefficient;" and replace with --$\alpha$ is the damping coefficient;--.

Column 16, Line 16:
Delete the phrase "Bi" and replace with --$B_1$--.

Column 16, Line 17:
Delete the phrase "Bi" and replace with --$B_1$--.

Column 16, Line 29:
Delete the phrase "Bi" and replace with --$B_1$--.

In the Claims

Claim 1, Column 17, Line 23:
Delete the phrase "$5 \times 10^6$ J m$^{-1}$." and replace with --$5 \times 10^6$ J m$^{-3}$.--.

Signed and Sealed this
Twenty-eighth Day of June, 2022

Katherine Kelly Vidal
*Director of the United States Patent and Trademark Office*